(12) United States Patent
Adachi et al.

(10) Patent No.: US 8,398,250 B2
(45) Date of Patent: Mar. 19, 2013

(54) PROJECTION DISPLAY DEVICE

(75) Inventors: Takaharu Adachi, Gifu (JP); So Suzuki, Osaka (JP); Taichi Yoshimura, Osaka (JP); Yufeng Yang, Guangdong (CN); Xianglin Zhang, Guangdong (CN)

(73) Assignees: SANYO Electric Co., Ltd., Moriguchi-shi, Osaka (JP); SANYO Technology Center (Shenzhen) Co., Ltd., Shenzhen, Guangdong (CN)

( * ) Notice: Subject to any disclaimer, the term of this patent is extended or adjusted under 35 U.S.C. 154(b) by 305 days.

(21) Appl. No.: 12/872,515

(22) Filed: Aug. 31, 2010

(65) Prior Publication Data

US 2011/0075117 A1 Mar. 31, 2011

(30) Foreign Application Priority Data

Sep. 29, 2009 (JP) .................................. 2009-225593

(51) Int. Cl.
G03B 21/14 (2006.01)
G03B 21/22 (2006.01)
A47B 81/00 (2006.01)

(52) U.S. Cl. ........................................ 353/119; 312/10.1

(58) Field of Classification Search .................. 353/119, 353/122, 18, 47, 74; 352/242, 34; 348/789, 348/787, 836; 362/362; 312/10.1
See application file for complete search history.

(56) References Cited

U.S. PATENT DOCUMENTS

| | | | |
|---|---|---|---|
| 7,108,382 B2 * | 9/2006 | Oross | 353/119 |
| 7,258,468 B2 * | 8/2007 | Peng et al. | 362/362 |
| 2006/0044513 A1 * | 3/2006 | Sakurai | 353/20 |
| 2009/0051887 A1 * | 2/2009 | Chen et al. | 353/119 |

FOREIGN PATENT DOCUMENTS

JP 2004-252473 A 9/2004

* cited by examiner

*Primary Examiner* — William C Dowling
*Assistant Examiner* — Ryan Howard
(74) *Attorney, Agent, or Firm* — Westerman, Hattori, Daniels & Adrian, LLP

(57) ABSTRACT

A projection display device includes a light source; an optical system which modulates light from the light source, and emits the modulated light; a projecting portion which enlarges and projects the light emitted from the optical system; a cabinet which houses the light source, the optical system, and the projecting portion; an opening which is formed in one surface of the cabinet to allow mounting or dismounting of an optical component constituting the optical system, or the light source; a cover which covers the opening; and a holding portion which holds the cover in such a manner that the cover is allowed to slide in a direction along the one surface.

4 Claims, 21 Drawing Sheets

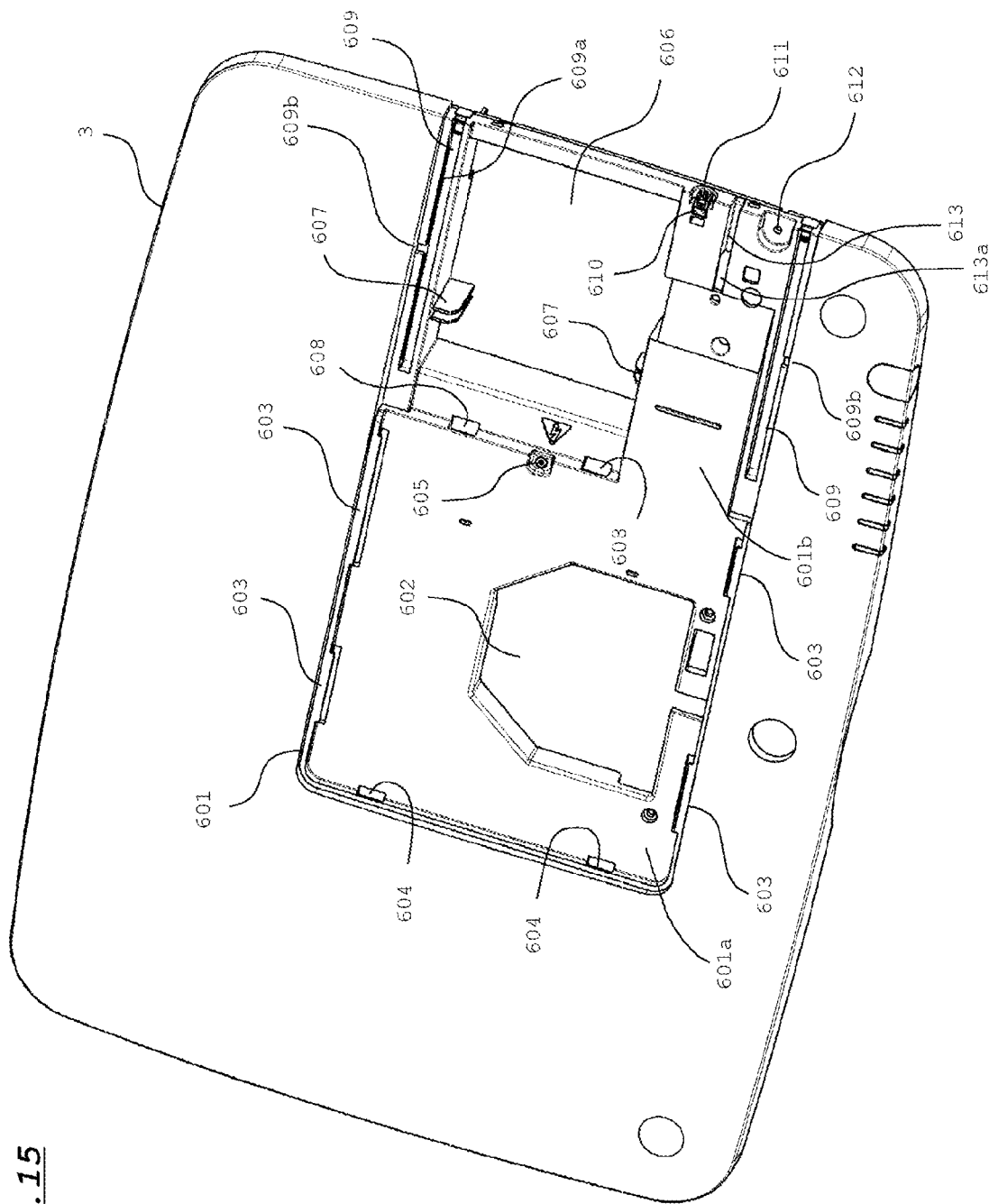

PROJECTION DISPLAY DEVICE

This application claims priority under 35 U.S.C. Section 119 of a Japanese Patent Application No. 2009-225593 filed Sep. 29, 2009, entitled "PROJECTION DISPLAY DEVICE". The disclosures of the above application are incorporated herein by reference.

BACKGROUND OF THE INVENTION

1. Field of the Invention

The present invention relates to a projection display device for modulating light from a light source, and enlarging and projecting the modulated light.

2. Disclosure of Related Art

Generally, a lamp such as a metal halide lamp or a high pressure mercury lamp is used as a light source in a projection display device such as a liquid crystal projector. These lamps are deteriorated due to a long-time operation. In the case where it is impossible to obtain a proper luminance due to deterioration of the lamp, it is necessary to replace the lamp with a new one.

In the projection display device, there is proposed an arrangement, wherein a cabinet is formed with an opening through which a light source is mounted or dismounted so that the light source can be replaced without disassembling the cabinet. The opening is opened and closed by a cover.

In the projection display device, there is proposed an arrangement, wherein a cover is completely detached from a cabinet in opening the cover. In this arrangement, it is necessary to place the detached cover in a position where replacement of a light source is not obstructed, which requires a cumbersome operation. In view of the above, there is proposed e.g. an arrangement, wherein a cover is interconnected to a cabinet by a hinge so that the cover can be opened in a state that the cover is mounted on the cabinet.

In the above arrangement, however, it is impossible to sufficiently open the cover, if there is not a sufficient space on the outside of a surface of the cabinet where the cover is mounted, and the cover may obstruct mounting or dismounting of the light source.

In the projection display device, an optical component other than the light source may be replaced. Accordingly, it is desirable to configure an arrangement, wherein an optical component other than a light source can be easily replaced, as well as the light source.

SUMMARY OF THE INVENTION

A projection display device according to a main aspect of the invention includes a light source; an optical system which modulates light from the light source, and emits the modulated light; a projecting portion which enlarges and projects the light emitted from the optical system; a cabinet which houses the light source, the optical system, and the projecting portion; an opening which is formed in one surface of the cabinet to allow mounting or dismounting of an optical component constituting the optical system, or the light source; a cover which covers the opening; and a holding portion which holds the cover in such a manner that the cover is allowed to slide in a direction along the one surface.

In the projection display device according to the main aspect of the invention, the opening can be opened by sliding the cover with respect to the holding portion. Accordingly, the opening can be sufficiently opened, even if the space defined on the outside of the cover is small in the state that the projection display device is installed.

BRIEF DESCRIPTION OF THE DRAWINGS

These and other objects, and novel features of the present invention will become more apparent upon reading the following detailed description of the embodiment along with the accompanying drawings.

FIG. 15 is a perspective view of an upper cabinet in a state that a prism cover and a lamp cover in the embodiment are detached.

Figure 1A:
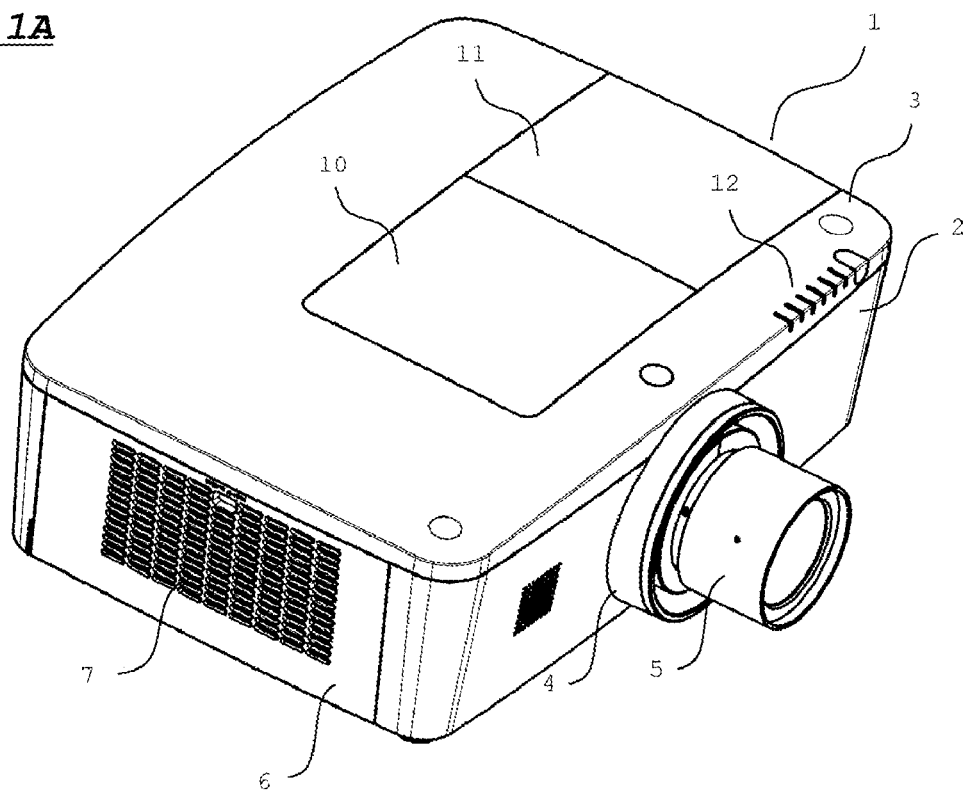
FIGS. 1A and 1B are diagrams showing an arrangement of a projector embodying the invention.

The drawings are provided mainly for describing the present invention, and do not limit the scope of the present invention.

DESCRIPTION OF PREFERRED EMBODIMENTS

In the following, an embodiment of the invention is described referring to the drawings.

In this embodiment, a projection lens 5 corresponds to a "projecting portion" in the claims. A prism cover 10 corresponds to a "cover" and a "second cover" in the claims. A lamp cover 11 corresponds to a "cover" and a "first cover" in the claims. A lamp unit 13 corresponds to a "light source" in the claims. A prism unit 16 corresponds to an "optical component" in the claims. A prism opening 602 corresponds to an "opening" and a "second opening" in the claims. A lamp opening 606 corresponds to an "opening" and a "first opening" in the claims. Guide ribs 603 correspond to a "holding portion" and a "second holding portion" in the claims. Guide grooves 609 and guide holes 609a correspond to a "holding portion" and a "first holding portion" in the claims. The description regarding the correspondence between the claims and the embodiment is merely an example, and the claims are not limited by the description of the embodiment.

Entire Arrangement of Projector

Figure 1B:
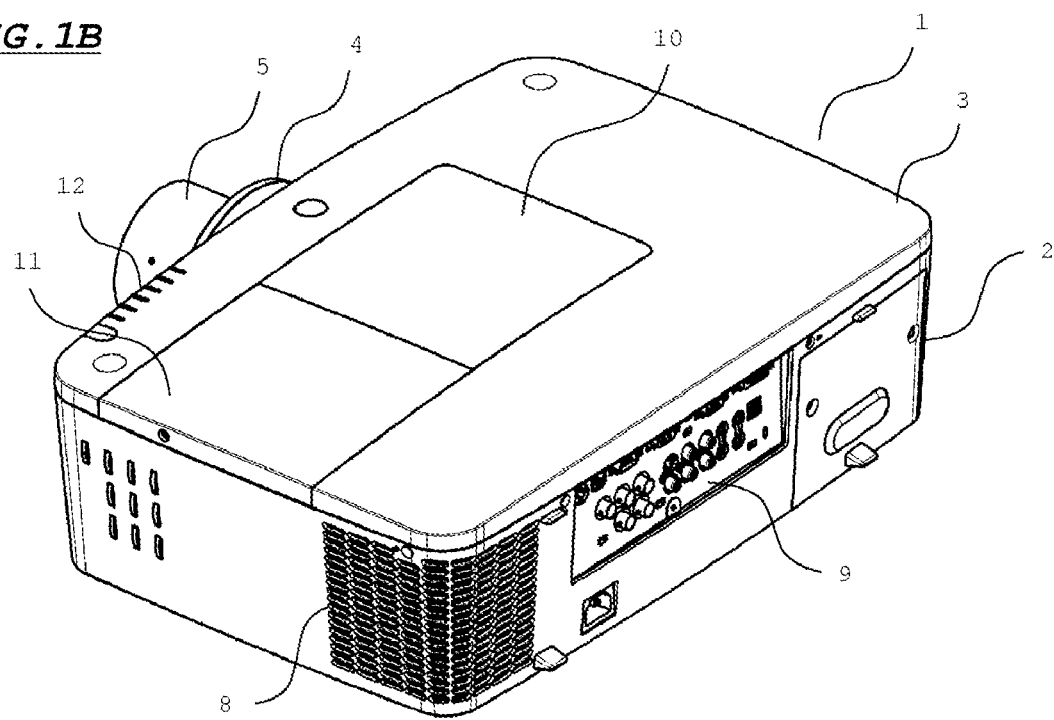

FIGS. 1A and 1B are diagrams showing an arrangement of a projector. FIG. 1A is a perspective view of the projector when viewed from a front of the projector. FIG. 1B is a perspective view of the projector when viewed from a rear of the projector.

Referring to FIGS. 1A and 1B, the projector includes a cabinet 1 having a substantially rectangular parallelepiped shape with a longer size in left and right directions. The cabinet 1 is constituted of a lower cabinet 2 with an upper surface thereof being opened, and an upper cabinet 3 for covering the upper surface of the lower cabinet 2.

A projection opening 4 is formed in a central part on a front surface of the lower cabinet 2. A front portion of a projection lens 5 is exposed through the projection opening 4.

A left side surface of the lower cabinet 2 is constituted of an air inlet cover 6, except for a front end and a rear end of the left side surface. The air inlet cover 6 has a hinge structure (not shown) at a lower end thereof, and is pivotally opened in the left direction about the lower end (see FIGS. 2A and 2B). An air inlet 7 is formed in the air inlet cover 6. The air inlet 7 is constituted of a large number of slit holes.

An exhaust port 8 is formed in a right rear corner of the lower cabinet 2. The exhaust port 8 is constituted of a large number of slit holes. An AV terminal portion 9 is formed on a rear surface of the lower cabinet 2, and an AV (Audio Visual) signal is inputted from the AV terminal portion 9.

The upper cabinet 3 has a prism cover 10 and a lamp cover 11. The prism cover 10 is a cover for covering a prism opening formed in the upper cabinet 3. The prism opening is used for e.g. replacement of a prism unit or adjustment of a polarizer. The lamp cover 11 is a cover for covering a lamp opening formed in the upper cabinet 3. The lamp opening is used for replacement of a lamp unit. Upper surfaces of the prism cover 10 and the lamp cover 11 are formed flush with an upper surface of the upper cabinet 3. An attachment structure as to how the prism cover 10 and the lamp cover 11 are attached to the upper cabinet 3 will be described later.

An indicator portion 12 is formed on a right-side front end of the upper cabinet 3. The indicator portion 12 has plural LEDs. A user is notified of whether the projector is in an operation state or in a standby state, or notified of various error statuses by on/off states of the respective LEDs. For instance, the indicator portion 12 may notify the user of a timing when the lamp unit is to be replaced.

Figure 2A:
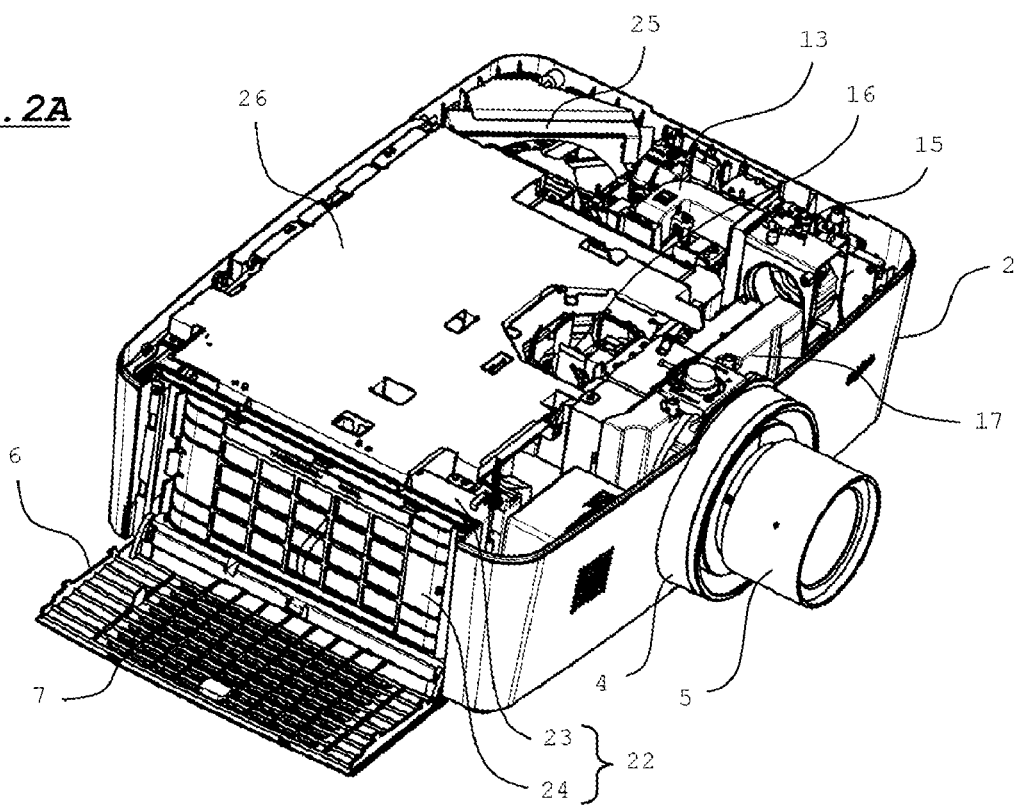
FIGS. 2A and 2B are diagrams showing an inner structure of the projector embodying the invention.
Figure 2B:
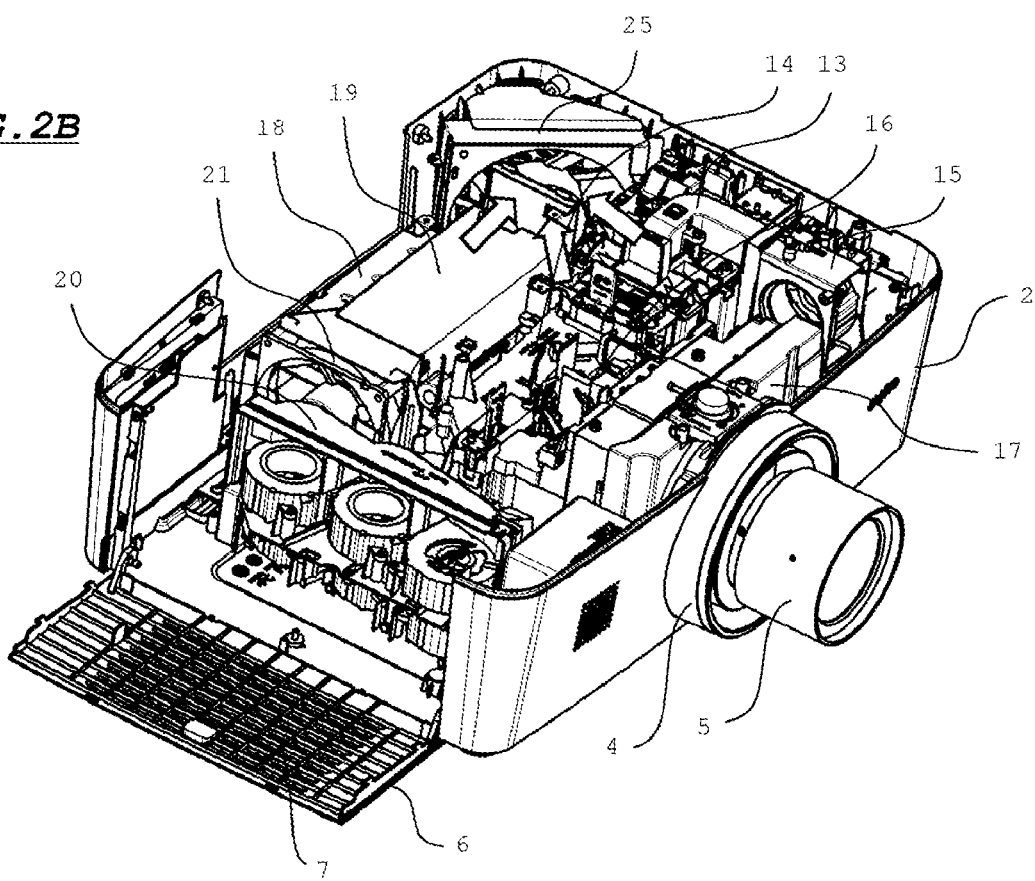

FIGS. 2A and 2B are diagrams showing an inner structure of the projector. FIG. 2A is a perspective view of the projector in a state that the upper cabinet 3 is detached. FIG. 2B is a perspective view of the projector in a state that a control circuit board 26, the AV terminal portion 9, and an air inlet member 22 are detached from the state shown in FIG. 2A.

Referring to FIG. 2B, the lower cabinet 2 is internally provided with a lamp unit 13, and an optical system 14 for modulating light from the lamp unit 13 to generate image light.

The lamp unit 13 is disposed at a central part on a right side surface of the lower cabinet 2 in such a manner that the lamp unit 13 is detachably attached from above. The lamp unit 13 is constituted of a light source lamp 300, and a lamp holder 400 for holding the light source lamp 300 (see FIGS. 10A and 10B). A fan unit 15 is disposed in front of the lamp unit 13. The fan unit 15 supplies an air to cool the light source lamp 300. The lamp holder 400 is formed with an air duct through which the cooling air from the fan unit 15 is guided to the light source lamp 300. The detailed arrangement of the lamp unit 13 will be described later.

The optical system 14 is disposed on the left of the lamp unit 13 and in a central part of the lower cabinet 2. The optical system 14 includes a prism unit 16. The prism unit 16 is disposed inside the lower cabinet 2 in such a manner that the prism unit 16 is detachable from above. The detailed arrangement of the optical system 14 will be described later.

A lens shift unit 17 is disposed in front of the optical system 14. The projection lens 5 is mounted on the lens shift unit 17. The projection lens 5 enlarges image light generated by the optical system 14, and projects the enlarged image light onto a projection plane such as a screen. The lens shift unit 17 shifts the projection lens 5 in up and down directions and left and right directions by using a driving force of a motor. By performing the above operation, the position of a projected image can be adjusted.

A power source unit 18 is disposed behind the optical system 14. The power source unit 18 has a power source circuit, and supplies a power source to each of the electrical components of the projector. A lamp ballast 19 is disposed at an upper portion of the power source unit 18. The lamp ballast 19 converts a power source supplied from the power source unit 18 into a power source suitable for the light source lamp 300, and supplies the converted power source to the light source lamp 300.

The lower cabinet 2 is further internally provided with a cooling device 20. The cooling device 20 has six cooling fans, and supplies the external air drawn in through the air inlet 7 to the exothermic components of the optical system 14 such as the prism unit 16 to cool the exothermic components. The detailed arrangement of the cooling device 20 will be described later.

A power source cooling fan 21 is disposed on the left of the power source unit 18 and the lamp ballast 19. The power source cooling fan 21 supplies an air to the power source unit 18 and the lamp ballast 19 to cool the power source unit 18 and the lamp ballast 19. An axial fan is used as the power source cooling fan 21, for example.

Next, referring to FIG. 2A, the air inlet member 22 is mounted on a left side portion of the lower cabinet 2. The air inlet member 22 is constituted of a frame member 23, and a filter member 24 mounted on the frame member 23. An air inlet (not shown) is formed in a surface of the frame member 23 opposing to the filter member 24. The filter member 24 is covered by the air inlet cover 6. In replacing the filter member 24, the air inlet cover 6 is opened, and the filter member 24 is detached from the frame member 23.

An air flow velocity sensor (not shown) is disposed in the air inlet member 22 at a position downstream of the filter member 24. A determination is made as to whether the filter member 24 is clogged, based on an air flow velocity to be detected by the air flow velocity sensor, and the user is notified of whether the filter member 24 is clogged by e.g. the indicator portion 12.

In response to activation of e.g. the lamp unit 13, the cooling device 20, and the power source cooling fan 21, the external air is drawn in through the air inlet 7 of the air inlet cover 6, the filter member 24, and the air inlet of the frame member 23.

An exhaust fan 25 is disposed at the right rear corner of the lower cabinet 2. The exhaust fan 25 is disposed in oblique direction with respect to the right side surface and the rear surface of the lower cabinet 2, and an intake surface of the exhaust fan 25 is directed obliquely leftward in the front direction. An axial fan is used as the exhaust fan 25, for example.

In response to activation of the exhaust fan 25, as shown in FIG. 2B, the cooling air which has cooled the power source unit 18 and the lamp ballast 19 is drawn in toward the exhaust fan 25 in the direction from the left side, and the cooling air which has cooled the light source lamp 300 and exited the lamp unit 13 is drawn in toward the exhaust fan 25 in the direction from the front side. Further, the cooling air which has cooled the optical system 14 is drawn in toward the exhaust fan 25 obliquely leftward from the front direction. In performing the above operation, since the intake surface of the exhaust fan 25 is directed obliquely leftward in the front direction, the cooling air to be supplied in the three directions i.e. from the side of the lamp unit 13, the side of the power source unit 18, and the side of the optical system 14 is easily drawn in toward the exhaust fan 25. Thus, the above arrangement enables to smoothly discharge the cooling air which has cooled the exothermic components to the exterior of the projector, thereby advantageously cooling the exothermic components.

Further, since the air inlet 7 is formed in aside surface (the left side surface) opposite to the position where the exhaust fan 25 is disposed, the external air drawn in through the air inlet 7 is drawn in toward the exhaust fan 25, after having been sufficiently used for cooling the lamp unit 13, the power source unit 18, and the optical system 14. Thus, the arrangement is further advantageous in cooling the exothermic components.

Furthermore, the cooling air to be supplied in the three directions is not discharged immediately after exiting the exhaust fan 25, but is discharged after having been sufficiently mixed in a space between an exhaust surface of the exhaust fan 25 and a corner of the lower cabinet 2. The light source lamp 300 is heated to an exceedingly high temperature, as compared with the power source unit 18 or a like member. Accordingly, the cooling air from the side of the lamp unit 13 is heated to an exceedingly high temperature, as compared with the cooling air in the other directions. However, as described above, since the cooling air which has been drawn in toward the exhaust fan 25 from the side of the lamp unit 13 is discharged after having been sufficiently mixed with the cooling air in the other directions, the temperature of the discharged air can be lowered.

Furthermore, since the exhaust fan 25 is disposed in oblique direction, it is possible to dispose a largest possible exhaust fan in a limited space enclosed by the corner of the lower cabinet 2, the lamp unit 13, and the power source unit 18.

Furthermore, since the exhaust port 8 is formed in the corner of the lower cabinet 2, it is possible to increase the opening area of the exhaust port 8. Thus, a more smooth air discharge operation can be performed.

The exhaust fan 25 may be disposed at a corner other than the right rear corner, depending on the dispositions of the respective constituent components in the lower cabinet 2.

As shown in FIG. 2A, the control circuit board 26 is disposed above the optical system 14 and the power source unit 18. The control circuit board 26 is provided with a control circuit for controlling driving components such as liquid crystal panels and the light source lamp 300. The control circuit board 26 is cut away at a position above the prism unit 16. In this arrangement, the prism unit 16 is detachably attached from above in a state that the control circuit board 26 is mounted.

Arrangement of Optical System

Figure 3:
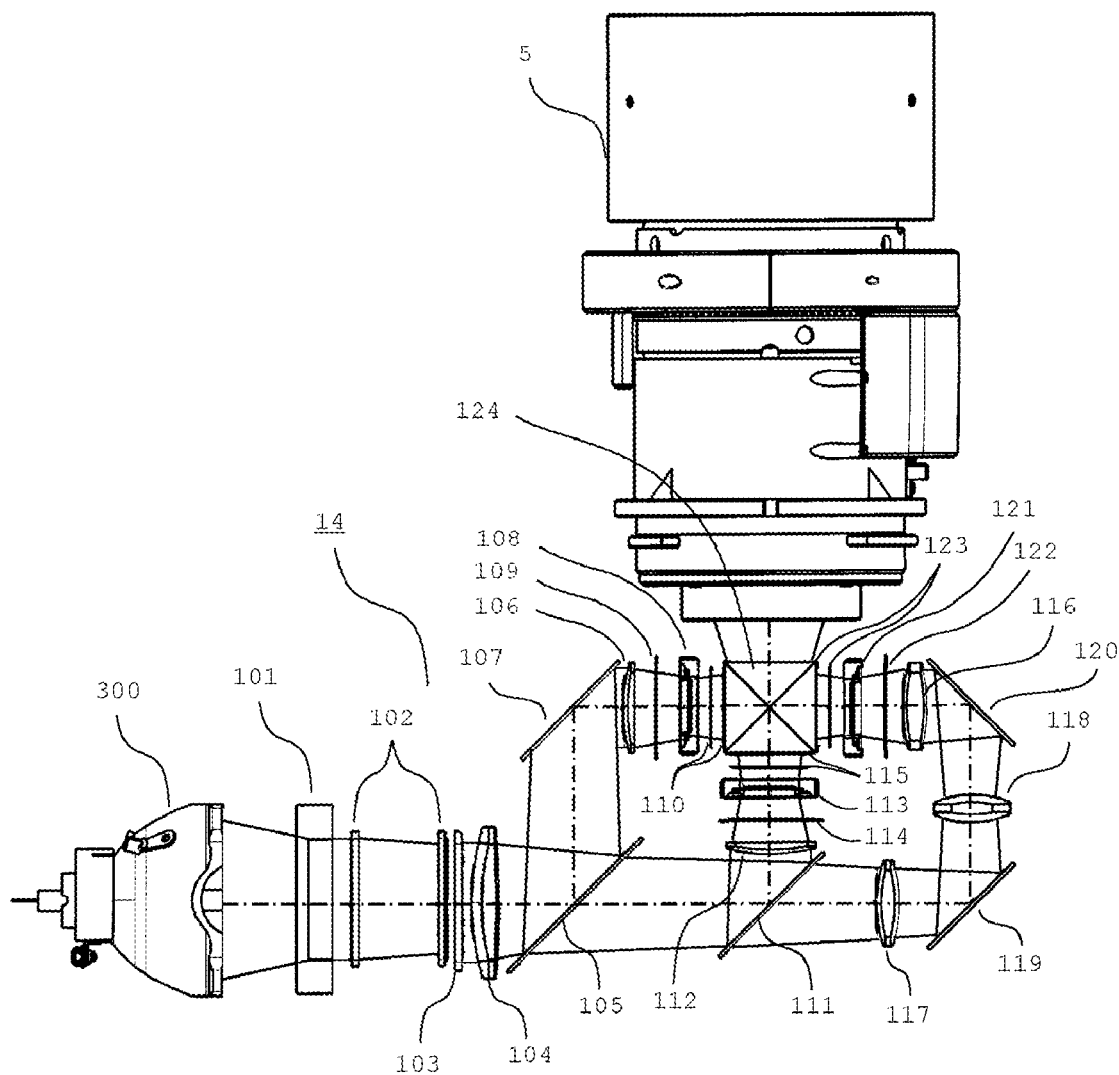
FIG. 3 is a diagram showing an arrangement of an optical system in the embodiment.

FIG. 3 is a diagram showing an arrangement of the optical system 14.

White light emitted from the light source lamp 300 is transmitted through a condenser lens 101, a fly-eye integrator 102, and a PBS array 103. The fly-eye integrator 102 makes a light amount distribution of light of each of the colors to be irradiated to liquid crystal panels (which will be described later) uniform. The PBS array 103 aligns polarization directions of light of the respective colors toward a dichroic mirror 105 in one direction.

Light transmitted through the PBS array 103 is transmitted through a condenser lens 104, and entered into the dichroic mirror 105.

The dichroic mirror 105 reflects only light (hereinafter, called as "B light") in a blue wavelength band, and transmits light (hereinafter, called as "G light") in a green wavelength band and light (hereinafter, called as "R light") in a red wavelength band, out of the light entered into the dichroic mirror 105.

B light reflected on the dichroic mirror 105 is irradiated onto a liquid crystal panel 108 for B light in a proper irradiation state by a lens function by the condenser lens 104 and a condenser lens 106, and reflection on a reflection mirror 107. The liquid crystal panel 108 is driven in accordance with an image signal for B light to modulate the B light depending on a driven state of the liquid crystal panel 108. One incident-side polarizer 109 is disposed on the incident side of the liquid crystal panel 108. B light is irradiated onto the liquid crystal panel 108 through the incident-side polarizer 109. Further, two output-side polarizers 110 are disposed on the output side of the liquid crystal panel 108, and B light emitted from the liquid crystal panel 108 is entered into the output-side polarizers 110.

G light and R light transmitted through the dichroic mirror 105 are entered into a dichroic mirror 111. The dichroic mirror 111 reflects the G light and transmits the R light.

G light reflected on the dichroic mirror 111 is irradiated onto a liquid crystal panel 113 for G light in a proper irradiation state by a lens function by the condenser lens 104 and a condenser lens 112. The liquid crystal panel 113 is driven in accordance with an image signal for G light to modulate the G light depending on a driven state of the liquid crystal panel 113. One incident-side polarizer 114 is disposed on the incident side of the liquid crystal panel 113, and G light is irradiated onto the liquid crystal panel 113 through the incident-side polarizer 114. Further, two output-side polarizers 115 are disposed on the output side of the liquid crystal panel 113, and G light emitted from the liquid crystal panel 113 is entered into the output-side polarizers 115.

R light transmitted through the dichroic mirror 111 is irradiated onto a liquid crystal panel 121 for R light in a proper irradiation state by a lens function by the condenser lens 104, a condenser lens 116, and relay lenses 117 and 118, and reflection on reflection mirrors 119 and 120. The liquid crystal panel 121 is driven in accordance with an image signal for R light to modulate the R light depending on a driven state of the liquid crystal panel 121. One incident-side polarizer 122 is disposed on the incident side of the liquid crystal panel 121, and R light is irradiated onto the liquid crystal panel 121 through the incident-side polarizer 122. Further, two output-side polarizers 123 are disposed on the output side of the liquid crystal panel 121, and R light emitted from the liquid crystal panel 121 is entered into the output-side polarizers 123.

B light, G light, and R light modulated by the liquid crystal panels 108, 113, and 121 are transmitted through the output-side polarizers 110, 115, and 123, and entered into a dichroic prism 124. The dichroic prism 124 reflects B light and R light, and transmits G light, out of the B light, the G light, and the R light, to thereby combine the B light, the G light, and the R light. Thus, image light after the color combination is projected toward the projection lens 5 from the dichroic prism 124.

An imager constituting the optical system 14 may be a reflective liquid crystal panel or an MEMS device, in place of the transmissive liquid crystal panels 108, 113, and 121. Further, the optical system 14 may be constituted of e.g. a single-panel optical system incorporated with an imager and a color wheel, in place of the three-panel optical system incorporated with three imagers as described above.

Attachment Structure of Prism Unit

Figure 4A:
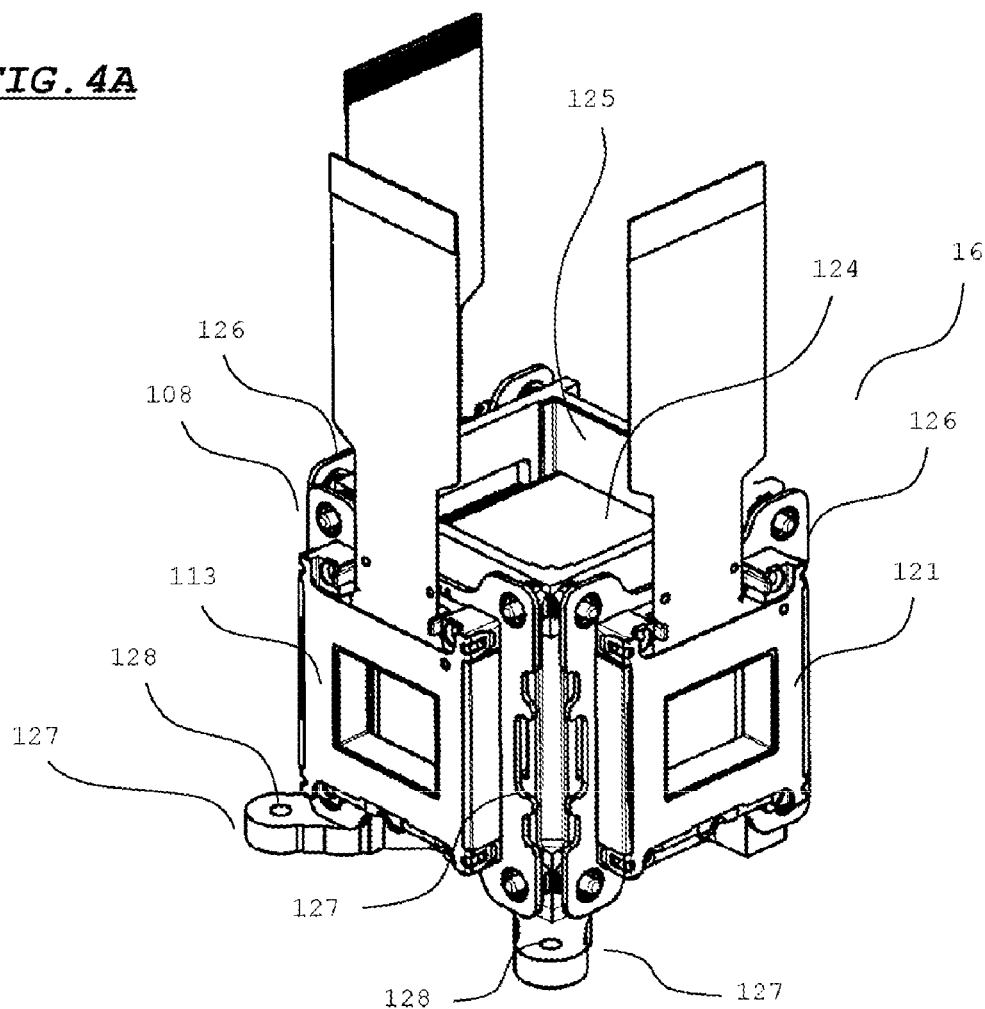
FIGS. 4A and 4B are diagrams showing an arrangement of a prism unit in the embodiment.
Figure 4B:
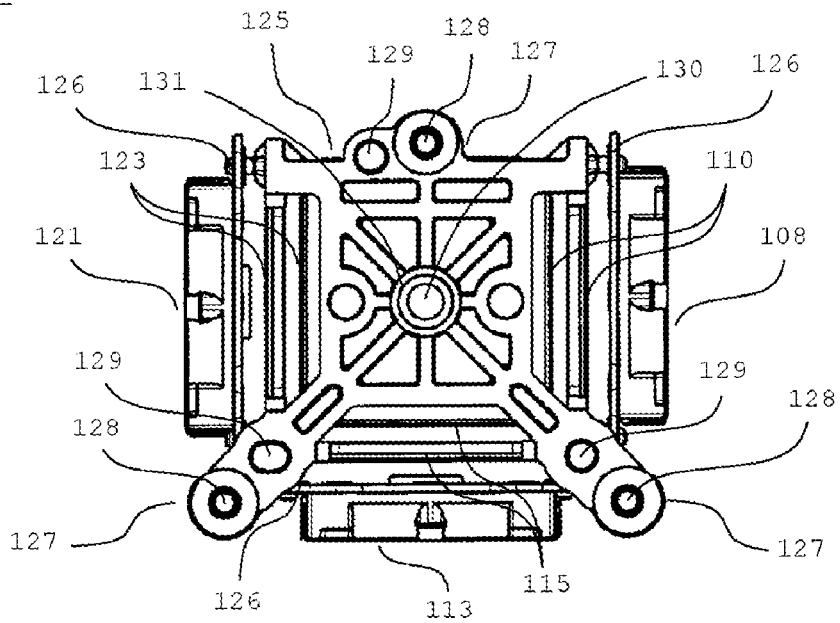

FIGS. 4A and 4B are diagrams showing an arrangement of the prism unit 16. FIG. 4A is a perspective view of the prism unit 16, and FIG. 4B is a bottom plan view of the prism unit 16.

The prism unit 16 is assembled into one unit by assembling the liquid crystal panels 108, 113, and 121, the output-side polarizers 110, 115, and 123, and the dichroic prism 124 on a prism holder 125. The liquid crystal panels 108, 113, and 121 are fixedly attached to the prism holder 125 via brackets 126.

An attachment leg 127 is provided at three positions on a bottom portion of the prism holder 125. Each of the attachment legs 127 is formed with an attachment hole 128 and a positioning hole 129. Further, an insertion hole 130 is formed in a central part on a bottom surface of the prism holder 125. An inwardly protruding annular flange portion 131 is formed at an entrance of the insertion hole 130.

Figure 5:
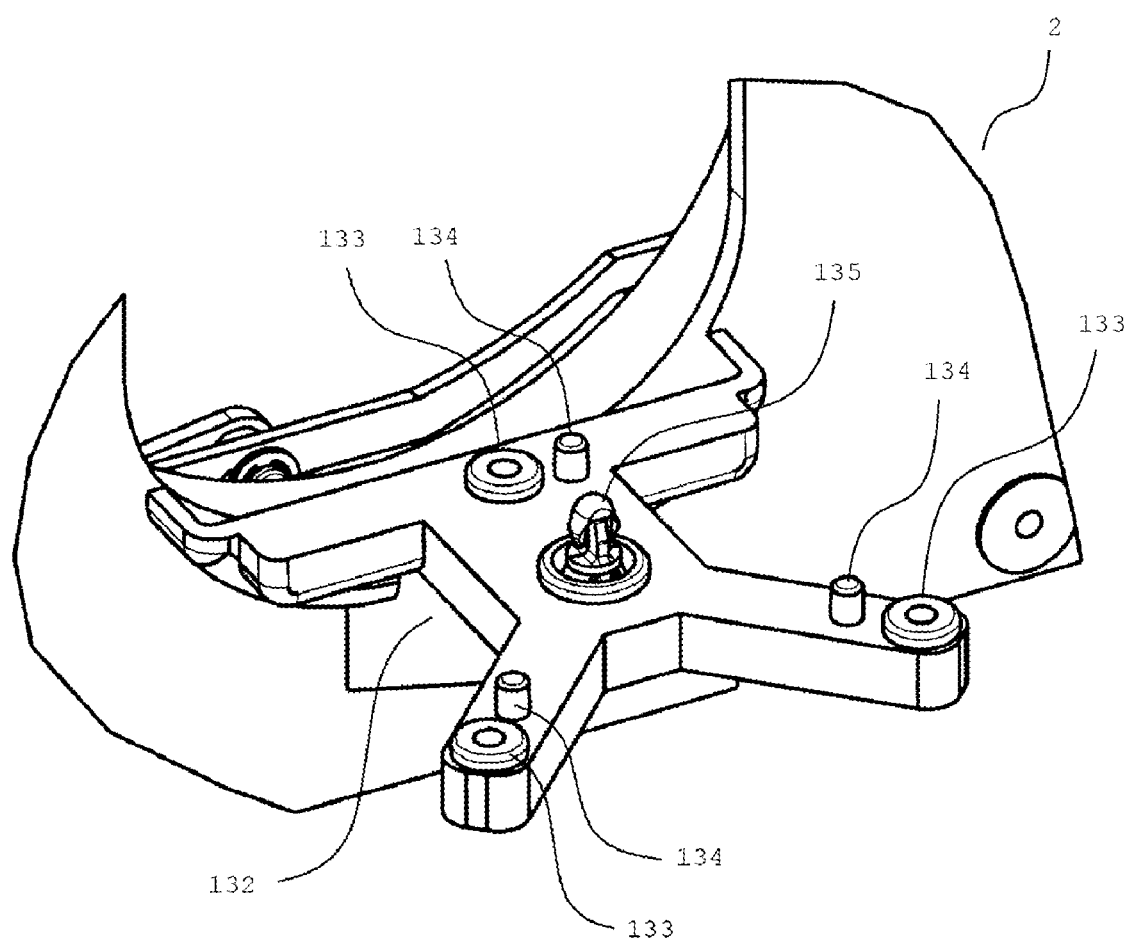
FIG. 5 is a diagram showing an arrangement of an attachment frame on which the prism unit in the embodiment is mounted.

FIG. 5 is a perspective view showing an arrangement of an attachment frame 132 on which the prism unit 16 is mounted.

The attachment frame 132 on which the prism unit 16 is mounted is provided in the lower cabinet 2. The attachment frame 132 is provided with three bosses 133 corresponding to the three attachment holes 128 of the prism holder 125. The attachment frame 132 is further provided with positioning projections 134 corresponding to the three positioning holes 129 of the prism holder 125. The attachment frame 132 is furthermore provided with a stopper pin 135 corresponding to the insertion hole 130.

Figure 6A:
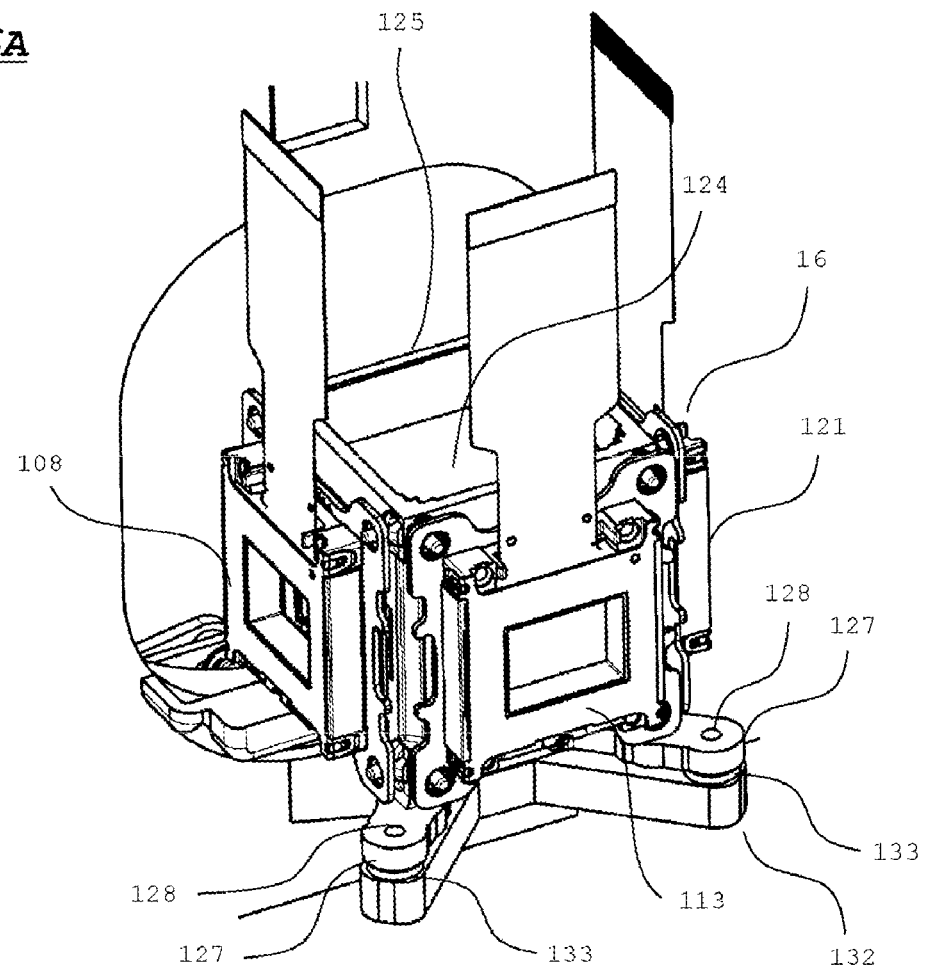
FIGS. 6A and 6B are diagrams showing a state that the prism unit in the embodiment is fixedly mounted on the attachment frame.
Figure 6B:
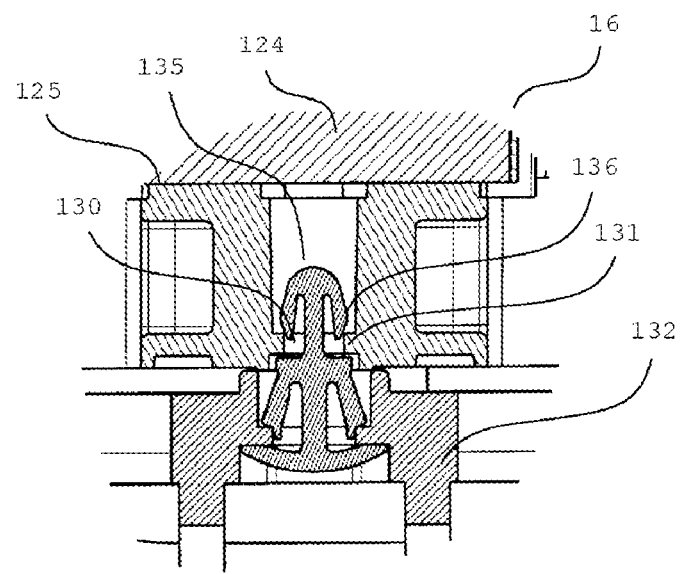

FIG. 6A is a perspective view showing a state that the prism unit 16 is fixedly mounted on the attachment frame 132. FIG. 6B is a cross-sectional view showing essential parts of the prism unit 16 in a state that the stopper pin 135 is received in the insertion hole 130.

The prism unit 16 is placed on the attachment frame 132 in such a manner that the positioning projections 134 are received in the corresponding positioning holes 129. Thereby, the attachment holes 128 of the prism holder 125 are aligned with the corresponding bosses 133. In the alignment operation, the stopper pin 135 is fitted into the insertion hole 130 of the prism unit 16. Then, by fastening the attachment legs 127 of the prism unit 125 to the bosses 133 by screws, the prism unit 16 is fixedly mounted on the attachment frame 132.

As shown in FIG. 6B, an engaging portion 136 which is flexed in the circumferential direction is formed at a lead end of the stopper pin 135. By inserting the stopper pin 135 in the insertion hole 130, the engaging portion 136 is engaged with the flange portion 131. In this state, there is no likelihood that the stopper pin 135 may come out of the insertion hole 130, even if a force substantially equal to the weight of the prism unit 16 is exerted in a direction of disengaging the stopper pin 135 from the insertion hole 130.

The installation manner of a projector includes a ceiling mount, wherein a projector is suspended from a ceiling, in addition to a fixed mount, wherein a projector is mounted on a floor surface or a desk surface. In the case of the ceiling mount, a projector is mounted upside down.

In this embodiment, in the case where a projector is suspended from a ceiling, there is no likelihood that the prism unit 16 may come out of the attachment frame 132 by the weight thereof, even if screws are unfastened from the bosses 133. Accordingly, mounting/dismounting operations of the prism unit 16 can be easily performed in replacing the prism unit 16.

In this embodiment, the stopper pin 135 as an independent member is fixedly attached to the attachment frame 132. Alternatively, a stopper portion formed with the engaging portion 136 may protrude from the attachment frame 132. In the modification, the stopper portion may be integrally formed with the attachment frame 132.

Arrangement of Cooling Device of Optical System

Figure 7A:
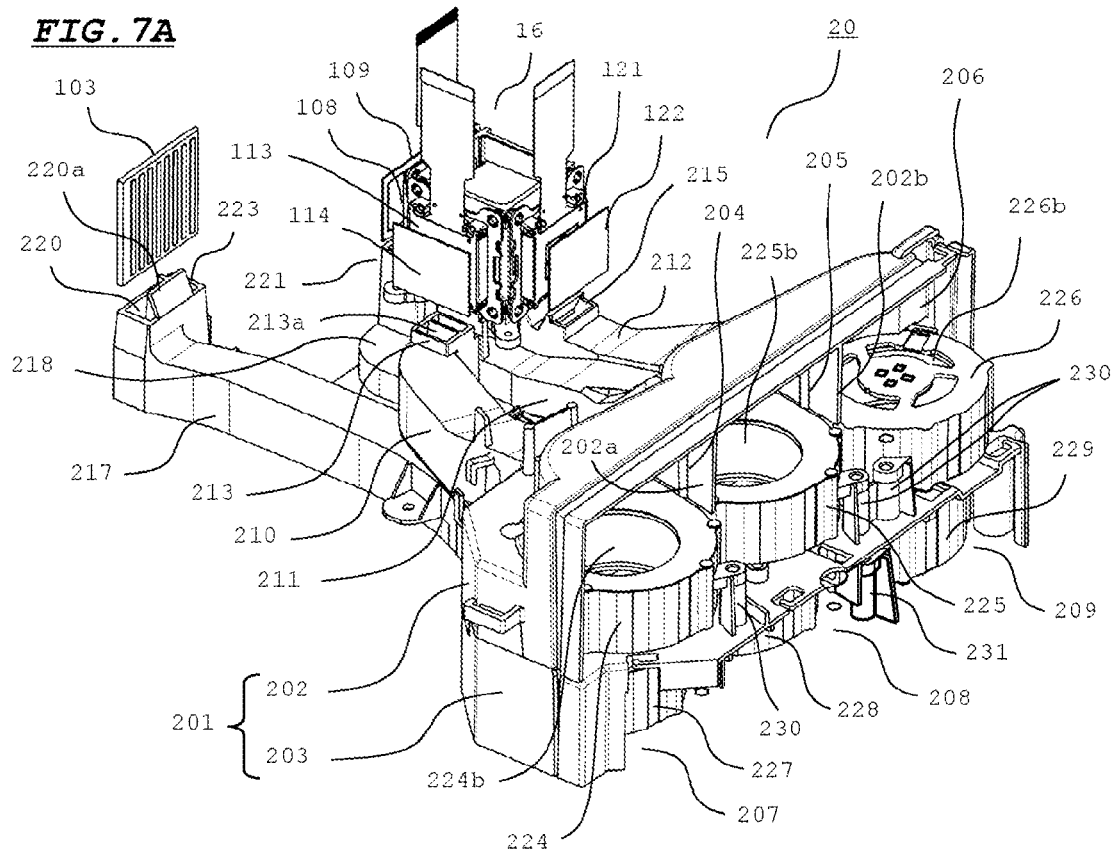
FIGS. 7A and 7B are diagrams showing an arrangement of a cooling device of the optical system in the embodiment.
Figure 7B:
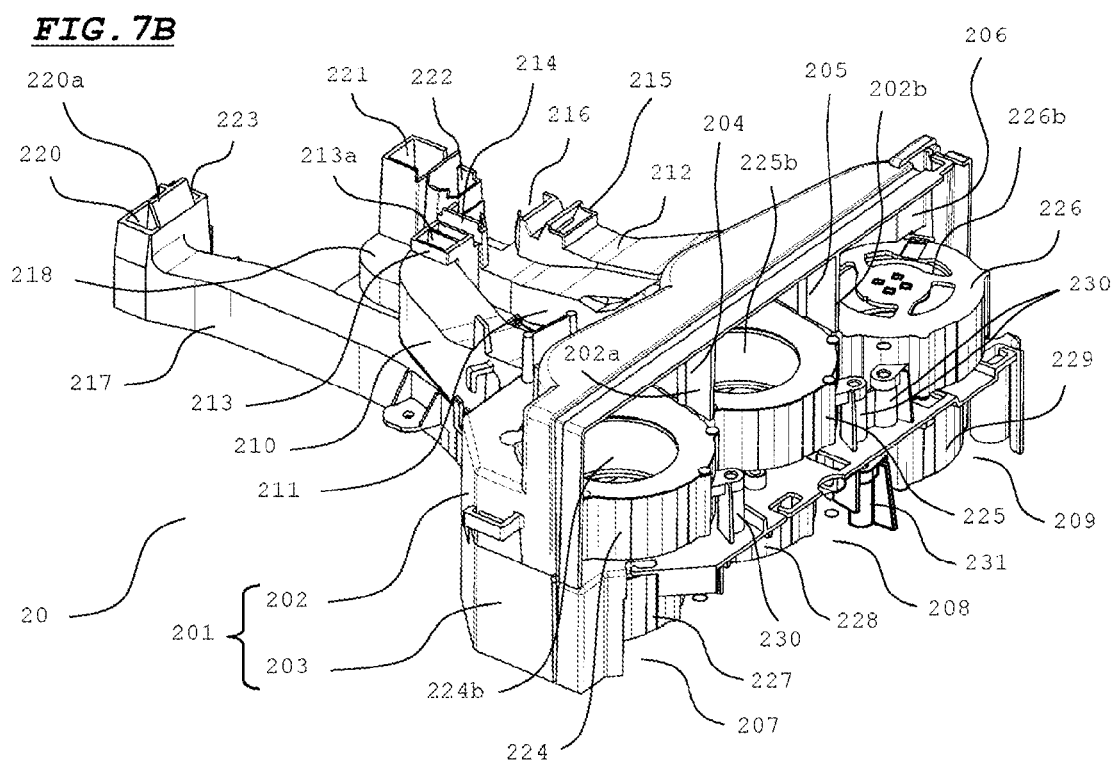
Figure 8A:
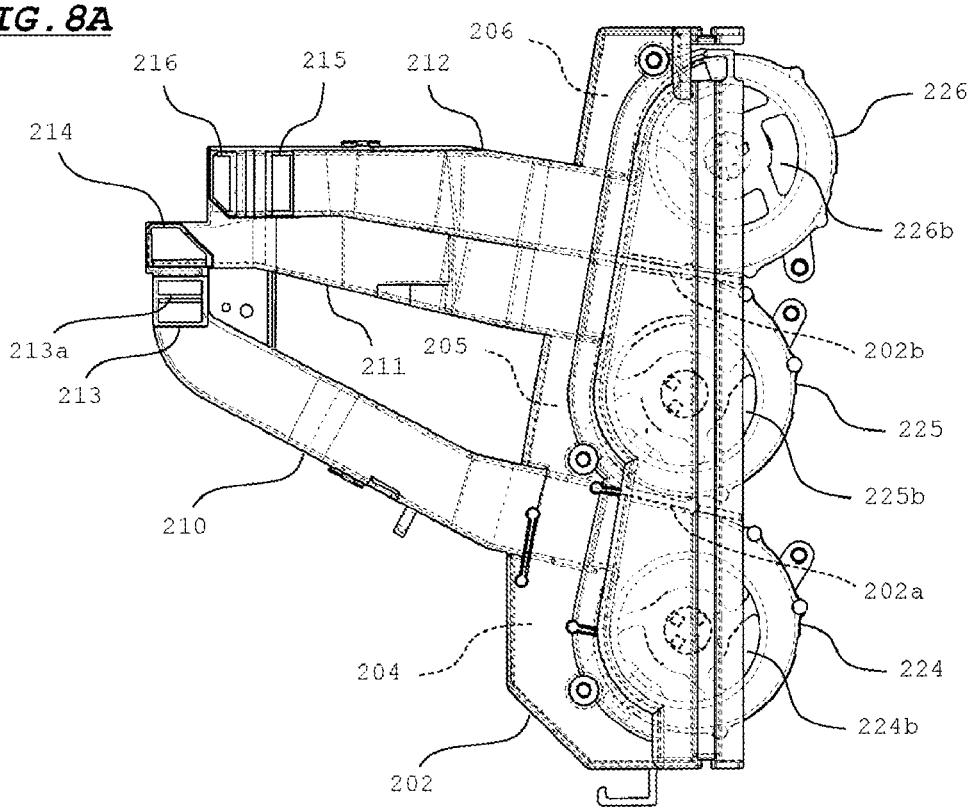
FIGS. 8A and 8B are diagrams showing an arrangement of an upper casing and first through third ducts in the embodiment.
Figure 8B:
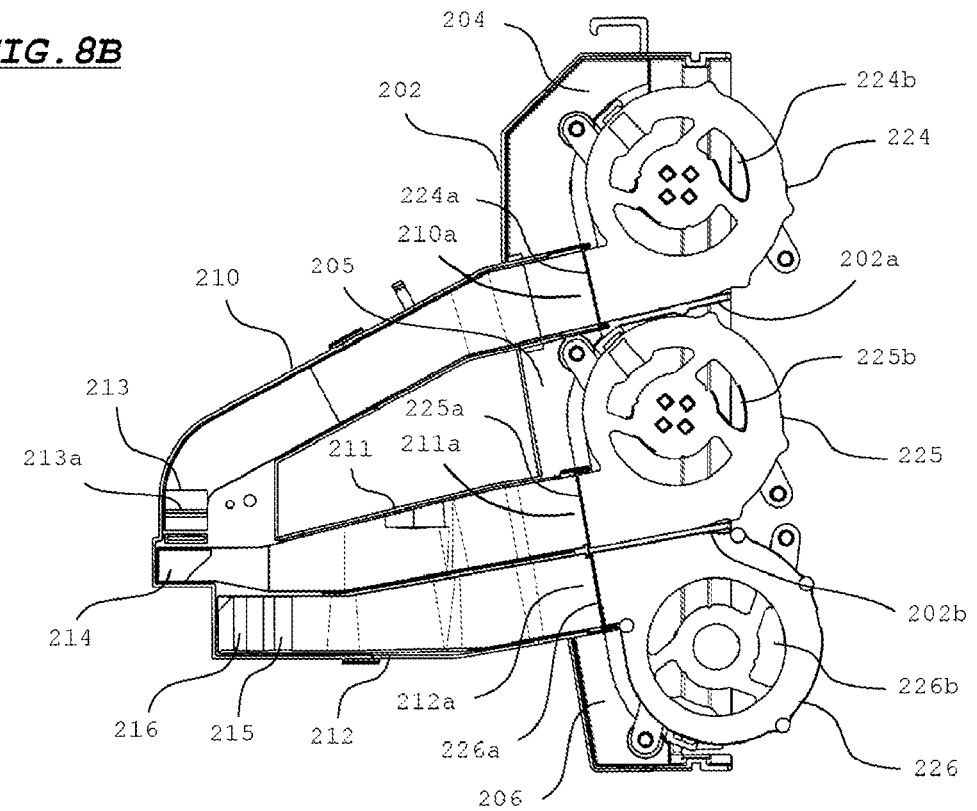
Figure 9A:
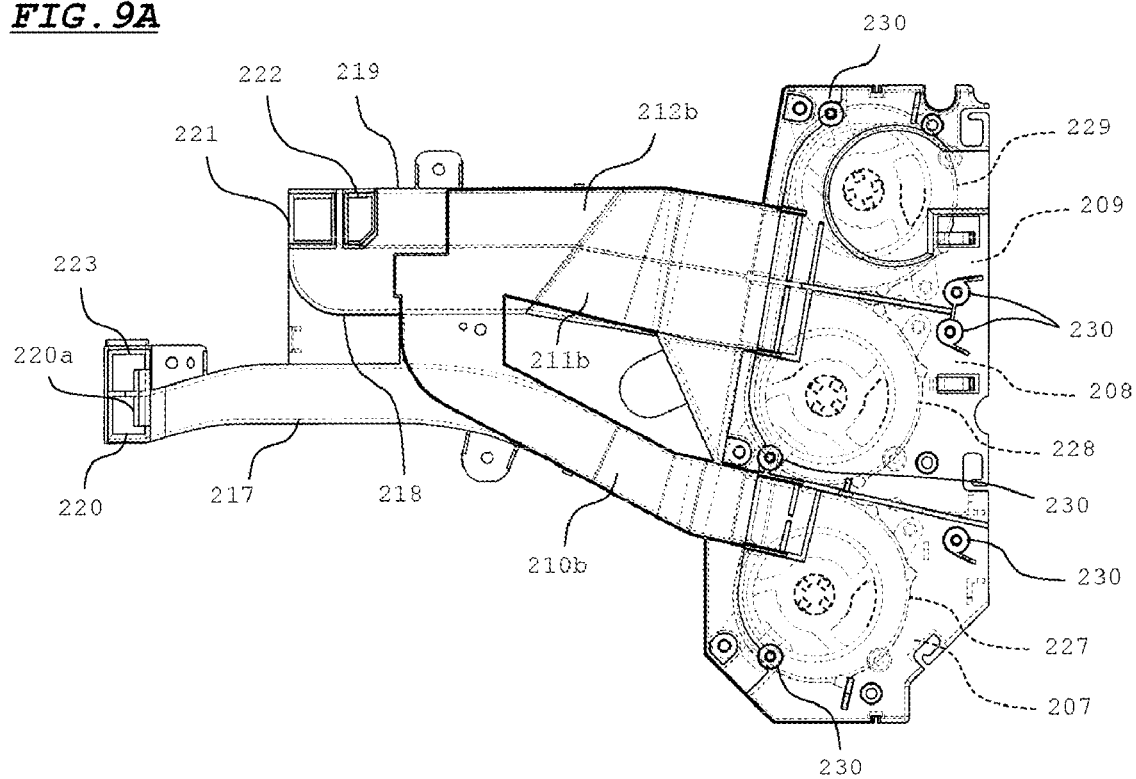
FIGS. 9A and 9B are diagrams showing an arrangement of a lower casing and fourth through sixth ducts in the embodiment.
Figure 9B:
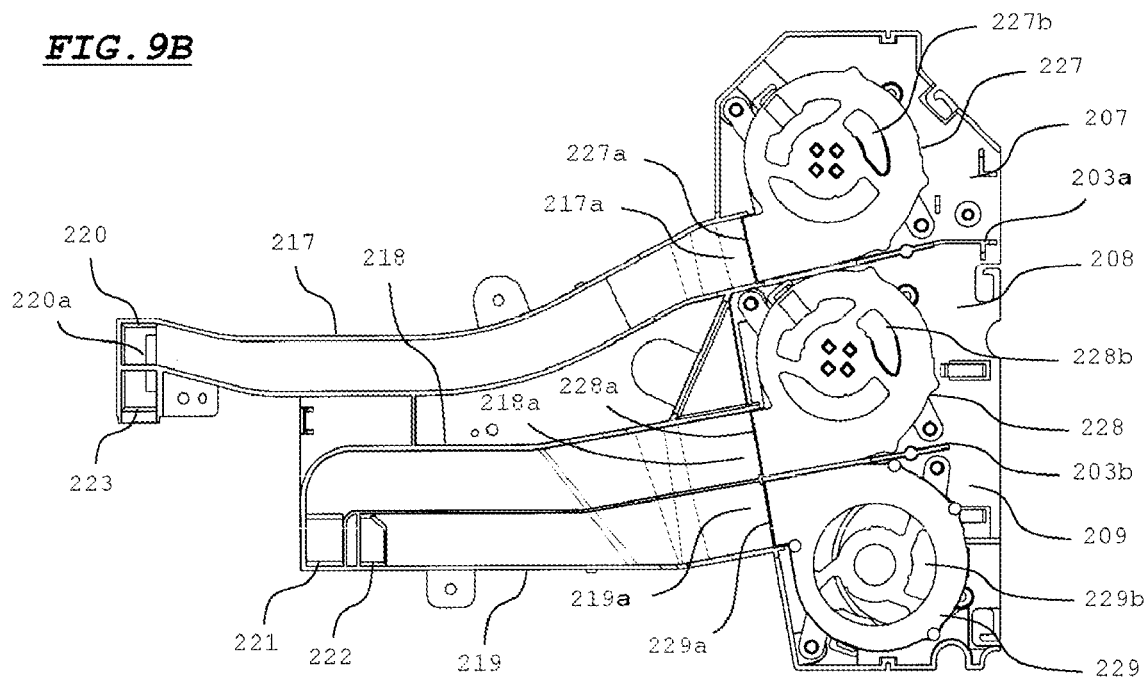

FIGS. 7A and 7B, FIGS. 8A and 8B, and FIGS. 9A and 9B are diagrams showing an arrangement of the cooling device 20 of the optical system 14. FIGS. 7A and 7B are perspective views of the cooling device 20. In FIG. 7A, only the prism unit 16 and the PBS array 103 in the arrangement of the optical system 14 are shown together with the cooling device 20. FIGS. 8A and 8B are respectively a top plan view and a bottom plan view of an upper casing 202, a first duct 210, a second duct 211, and a third duct 212. FIGS. 9A and 9B are respectively a top plan view and a bottom plan view of a lower casing 203, a fourth duct 217, a fifth duct 218, and a sixth duct 219.

The cooling device 20 has a fan casing 201. The fan casing 201 is constituted of the upper casing 202 and the lower casing 203. A rear surface and a bottom surface of each of the upper casing 202 and the lower casing 203 are opened. The lower casing 203 is mounted on the bottom surface of the lower cabinet 2, and the upper casing 202 is mounted on the lower casing 203.

The interior of the upper casing 202 is divided into three housing portions (a first housing portion 204, a second housing portion 205, and a third housing portion 206) by two partition walls 202a and 202b. Likewise, the interior of the lower casing 203 is divided into three housing portions (a fourth housing portion 207, a fifth housing portion 208, and a sixth housing portion 209) by two partition walls 203a and 203b.

The first housing portion 204, the second housing portion 205, and the third housing portion 206 of the upper casing 202 are respectively connected to the first duct 210, the second duct 211, and the third duct 212. Each of the first duct 210, the second duct 211, and the third duct 212 has a bottom surface thereof opened, and extends to a position below the prism unit 16. The first duct 210, the second duct 211, and the third duct 212 are integrally formed with the upper casing 202 by a resin material.

An air outlet 213 is formed in a lead end of the first duct 210. The air outlet 213 is directed toward the incident-side polarizer 114 and the liquid crystal panel 113 for G light. A partition member 213a is formed in the middle of an exit of the air outlet 213 to guide the cooling air to each of the incident-side polarizer 114 and the liquid crystal panel 113. An air outlet 214 is formed in a lead end of the second duct 211. The air outlet 214 is directed toward the output-side polarizers 115 for G light. Two air outlets 215 and 216 are formed in a lead end of the third duct 212. The air outlet 215 is directed to the incident-side polarizer 122 and the liquid crystal panel 121 for R light, and the air outlet 216 is directed to the output-side polarizers 123 for R light.

The fourth housing portion 207, the fifth housing portion 208, and the sixth housing portion 209 of the lower casing 203 are respectively connected to the fourth duct 217, the fifth duct 218, and the sixth duct 219. Each of the fourth duct 217, the fifth duct 218, and the sixth duct 219 has a bottom surface thereof opened. The fourth duct 217 extends to a position below the PBS array 103, and the fifth duct 218 and the sixth duct 219 each extends to a position below the prism unit 16. The fourth duct 217, the fifth duct 218, and the sixth duct 219 are integrally formed with the lower casing 203 by a resin material.

An air outlet 220 is formed in a lead end of the fourth duct 217. The air outlet 220 is directed toward the PBS array 103. An air outlet 221 is formed in a lead end of the fifth duct 218. The air outlet 221 is directed toward the incident-side polarizer 109 and the liquid crystal panel 108 for B light. An air outlet 222 is formed in a lead end of the sixth duct 219. The air outlet 222 is directed to the output-side polarizers 110 for B light. Another air outlet 223 is formed adjacent to the air outlet 220 for the PBS array 103. The air outlet 223 is communicated with a cooling fan (not shown) different from the cooling device 20, and the cooling air from the cooling fan is drawn through the air outlet 223. An air deflector 220a is provided at exits of the air outlets 220 and 223 to guide the air toward the PBS array 103.

As shown in FIG. 9A, bottom surface members 210b, 211b, and 212b corresponding to the first duct 210, the second duct 211, and the third duct 212 are integrally formed on upper surfaces of the fourth duct 217, the fifth duct 218, and the sixth duct 219. When the upper casing 202 is mounted on the lower casing 203, the bottom surfaces of the first duct 210, the second duct 211, and the third duct 212 are closed by the corresponding bottom surface members 210b, 211b, and 212b, whereby an air duct having an airtight structure is formed. On the other hand, when the lower casing 203 is mounted on the lower cabinet 2, the bottom surfaces of the fourth duct 217, the fifth duct 218, and the sixth duct 219 are closed by a bottom member (not shown) which is integrally formed with the lower cabinet 2, whereby an air duct having an airtight structure is formed.

Cooling fans (first through sixth fans 224 through 229) are respectively disposed in the first through the sixth housing portions 204 through 209 of the fan casing 201. As shown in FIGS. 8B and 9B, air outlets 224a through 229a of the respective cooling fans 224 through 229 are connected to entrances 210a through 212a of the corresponding first through the third ducts 210 through 212, and entrances 217a through 219a of the corresponding fourth through the sixth ducts 217 through 219. Each of the cooling fans 224 through 229 is a centrifugal fan having the same performance, with both surfaces thereof being formed into intake surfaces. Air inlets 224b through 229b are formed on both ends of each of the cooling fans 224 through 229.

Each of the first fan 224, the second fan 225, and the third fan 226 is fixedly fastened to an attachment boss 230 provided on the upper surface of the lower casing 203 by a screw. Likewise, each of the fourth fan 227, the fifth fan 228, and the sixth fan 229 is fixedly fastened to an attachment boss 231 provided on the bottom surface of the lower cabinet 2 by a screw. In a state that the first through the sixth fans 224 through 229 are fixedly attached to the attachment bosses 230 and 231, a clearance for drawing in the external air is formed between upper end surface of each of the cooling fans 224 through 229 and the upper surface of each of the first through the sixth housing portions 204 through 209, and a clearance for drawing in the external air is formed between the bottom surface of each of the cooling fans 224 through 229 and the bottom surface of each of the first through the sixth housing portions 204 through 209.

As shown in FIG. 2A, the rear surface of the fan casing 201 is covered by the air inlet member 22.

In the above arrangement, in response to activation of the cooling fans 224 through 229, the external air is drawn into the cabinet 1 through the air inlet member 22. The drawn external air passes through the upper and lower clearances of the first through the sixth housing portions 204 through 209 from the rear of the fan casing 201, and is drawn to the cooling fans 224 through 229 through the air inlets 224b through 229b formed in both end surfaces of each of the cooling fans 224 through 229.

The cooling air from the first fan 224 passes through the first duct 210, and is drawn in toward the incident-side polarizer 114 and the liquid crystal panel 113 for G light through the air outlet 213. As a result of the above operation, the incident-side polarizer 114 and the liquid crystal panel 113 are cooled. The cooling air from the second fan 225 passes through the second duct 211, and is drawn in toward the output-side polarizers 115 for G light through the air outlet 214. As a result of the above operation, the output-side polarizers 115 are cooled. The cooling air from the third fan 226 passes through the third duct 212, and is drawn in toward the incident-side polarizer 122 and the liquid crystal panel 121 for R light through the air outlet 215, and is also drawn in toward the output-side polarizers 123 for R light through the air outlet 216. As a result of the above operation, the incident-side polarizer 122, the liquid crystal panel 121, and the output-side polarizers 123 are cooled.

The cooling air from the fourth fan 227 passes through the fourth duct 217, and is drawn in toward the PBS array 103 through the air outlet 220. As a result of the above operation, the PBS array 103 is cooled. The cooling air from the fifth fan 228 passes through the fifth duct 218, and is drawn in toward the incident-side polarizer 109 and the liquid crystal panel 108 for B light through the air outlet 221. As a result of the above operation, the incident-side polarizer 109 and the liquid crystal panel 108 are cooled. The cooling air from the sixth fan 229 passes through the sixth duct 219, and is drawn in toward the output-side polarizers 110 for B light through the air outlet 222. As a result of the above operation, the output-side polarizers 110 are cooled.

In the prism unit 16, concerning the light amounts to be absorbed at the time of modulation, the calorific value generated by a green imager (constituted of the liquid crystal panel 113, the incident-side polarizer 114, and the output-side polarizers 115) becomes largest, and the calorific value generated by a blue imager (constituted of the liquid crystal panel 108, the incident-side polarizer 109, and the output-side polarizers 110) becomes second largest. As compared with the calorific values generated by these imagers, the calorific value generated by a red imager (constituted of the liquid crystal panel 121, the incident-side polarizer 122, and the output-side polarizers 123) is small. As compared with the calorific values generated by the liquid crystal panels 108, 113, and 121, and the incident-side polarizers 109, 114, and 122, the calorific values generated by the output-side polarizers 110, 115, and 123 are large. Thus, the calorific values are different from each other depending on the imagers.

In this embodiment, applied voltages to the second fan 225 and the third fan 226 are set equal to each other. This is because there is no significant difference in the required air volume between the second fan 225 and the third fan 226. Further, applied voltages to the first fan 224, the fifth fan 228, and the sixth fan 229 are set equal to each other. This is because there is no significant difference in the required air volume between the first fan 224, the fifth fan 228, and the sixth fan 229.

Further, applied voltages to the second fan 225, the third fan 226, and the fourth fan 227 are set higher than the applied voltages to the first fan 224, the fifth fan 228 and the sixth fan 229. The applied voltage to the second fan 225 is set high, because the calorific value generated by the output-side polarizers 115 for G light is largest, and it is necessary to increase the air volume for the output-side polarizers 115 for G light. The air volume for the third fan 226 is set high, because the red imager constituted of the incident-side polarizer 122, the liquid crystal panel 121, and the output-side polarizers 123 is cooled only by the third fan 226, and it is necessary to increase the air volume for the red imager.

As described above, by setting the air volumes of the second fan 225 and the third fan 226 larger than the air volumes of the first fan 224, the fifth fan 228 and the sixth fan 229, it is possible to efficiently cool the output-side polarizers 115 for G light, and the red imager.

The applied voltage to the fourth fan 227 is set equal to the applied voltages to the second fan 225 and the third fan 226. This is because the length of the fourth duct 217 extending to the PBS array 103 is longer than the lengths of the other air ducts, and a pressure loss of the fourth duct 217 is large.

As described above, in this embodiment, the cooling air from the third fan 226 is supplied to the red imager, the cooling air from the third fan 224 and the second fan 225 is supplied to the green imager, and the cooling air from the fifth fan 228 and the sixth fan 229 is supplied to the blue imager. Thus, the embodiment is configured to supply the cooling air from the individual cooling fans to each of the imagers. Accordingly, it is possible to set the air volumes of the cooling fans 224, 225, 226, 228, and 229 depending on the calorific values generated by the respective imagers. This is advantageous in efficiently cooling the prism unit 16, while reducing noises and electric power consumption.

Further, with respect to the green imager, the cooling air from the first fan 224 is supplied to the air outlet 213 directed toward the incident-side polarizer 114 and the liquid crystal panel 113, and the cooling air from the second fan 225 is supplied to the air outlet 214 directed toward the output-side polarizers 115. Thus, since the cooling air is supplied from the plural cooling fans to the green imager whose calorific value becomes largest, it is possible to secure a sufficient air volume to thereby sufficiently cool the target imager. Further, by setting the air volume of the first fan 224 depending on the calorific value generated by the incident-side polarizer 114 and the liquid crystal panel 113, and setting the air volume of the second fan 225 depending on the calorific value generated by the output-side polarizers 115, it is possible to efficiently cool these optical elements.

Similarly, with respect to the blue imager, the cooling air from the fifth fan 228 is supplied to the air outlet 221 directed to the incident-side polarizer 109 and the liquid crystal panel 108, and the cooling air from the sixth fan 229 is supplied to the air outlet 222 directed to the output-side polarizers 110. Thus, since the cooling air is supplied from the plural cooling fans to the blue imager whose calorific value is second largest to the green imager, it is possible to secure a sufficient air volume to thereby sufficiently cool the target imager. Further, by setting the air volume of the fifth fan 228 depending on the calorific value generated by the incident-side polarizer 109 and the liquid crystal panel 110, and setting the air volume of the sixth fan 229 depending on the calorific value generated by the output-side polarizers 110, it is possible to efficiently cool these optical elements.

In the case where the projector is configured to supply the cooling air from a single cooling fan to the two air outlets 213 and 214 (221 and 222) for the green (blue) imager through individual ducts, a large-sized cooling fan is necessary. An increase in the size of a cooling fan results in an increase in the size of an air outlet. As a result, a difference in opening area between the air outlet of the cooling fan, and the air outlets 213 and 214 (221 and 222) is increased. Then, the air flow rates of the respective air passages from the cooling fan to the air outlets 213 and 214 (221 and 222) are increased, which resultantly increases the pressure loss, and lowers the air supply rate of the cooling fan.

In this embodiment, since each of the cooling fans 224 and 225 (228 and 229) individually supplies the cooling air to the air outlets 213 and 214 (221 and 222) for the green (blue) imager, it is possible to reduce the size of the individual cooling fans 224 and 225 (228 and 229). Thus, since it is possible to reduce a difference in opening area between the air outlets 224a and 225a (228a and 229a) of the cooling fans 224 and 225 (228 and 229), and the air outlets 213 and 214 (221 and 222), it is possible to enhance the air supply rate of the cooling fans 224 and 225 (228 and 229).

In this embodiment, the six cooling fans 224 through 229 are divided into two groups, in each of which a required air volume is approximate to each other, and an applied voltage is set for each of the groups. Alternatively, for instance, the six cooling fans 224 through 229 may be divided into three or more groups depending on a required air volume, and an applied voltage may be set with respect to each of the groups. Further alternatively, applied voltages may be set individually with respect to all the six cooling fans 224 through 229.

Further alternatively, temperatures of the optical elements of the prism unit 16, and the PBS array 103 may be detected, and applied voltages to the cooling fans 224 through 229 may be changed, based on the detected temperatures. The modification is further advantageous in reducing noises and reducing electric power consumption.

Further, in this embodiment, one cooling fan (the third fan) is provided for both of the air outlets 215 and 216. Alternatively, a cooling fan may be provided for each of the air outlets 215 and 216. Further alternatively, three or more cooling fans may be provided for at least one of the imagers, as necessary.

Cooling Structure of Lamp Unit

Figure 10A:
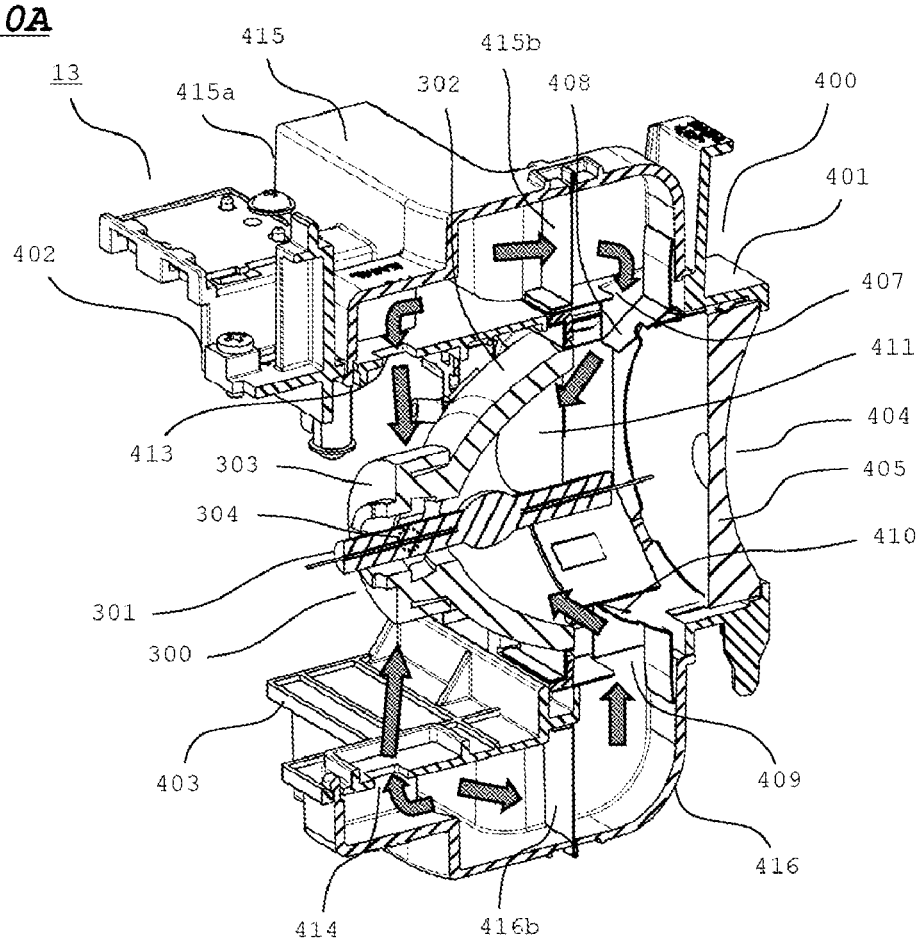
FIG. 10A is a perspective and elevational sectional view of a lamp unit in the embodiment, when viewed from a rear of the lamp unit.
Figure 10B:
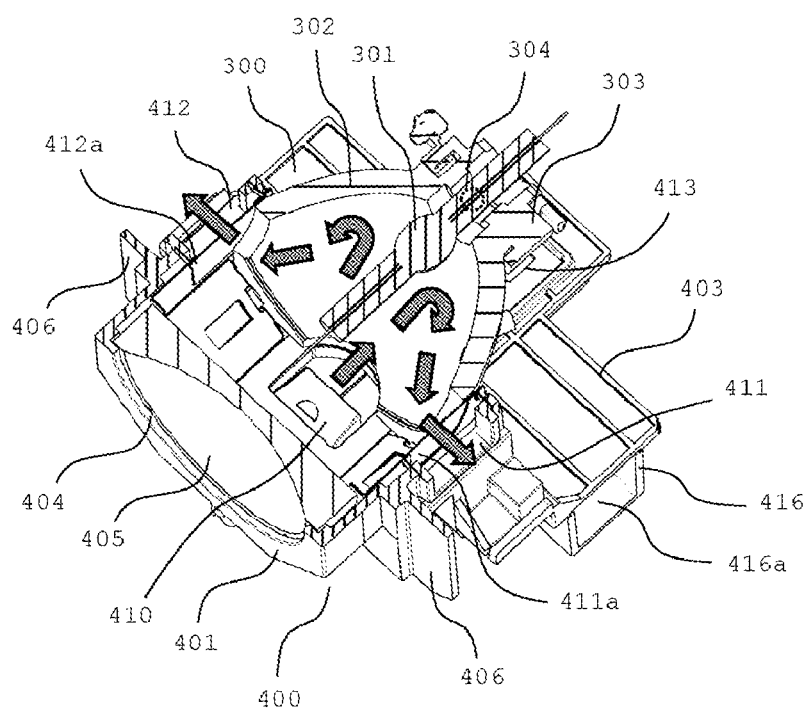
FIG. 10B is a perspective and transverse sectional view of the lamp unit in the embodiment, when viewed from a front of the lamp unit.
Figure 11:
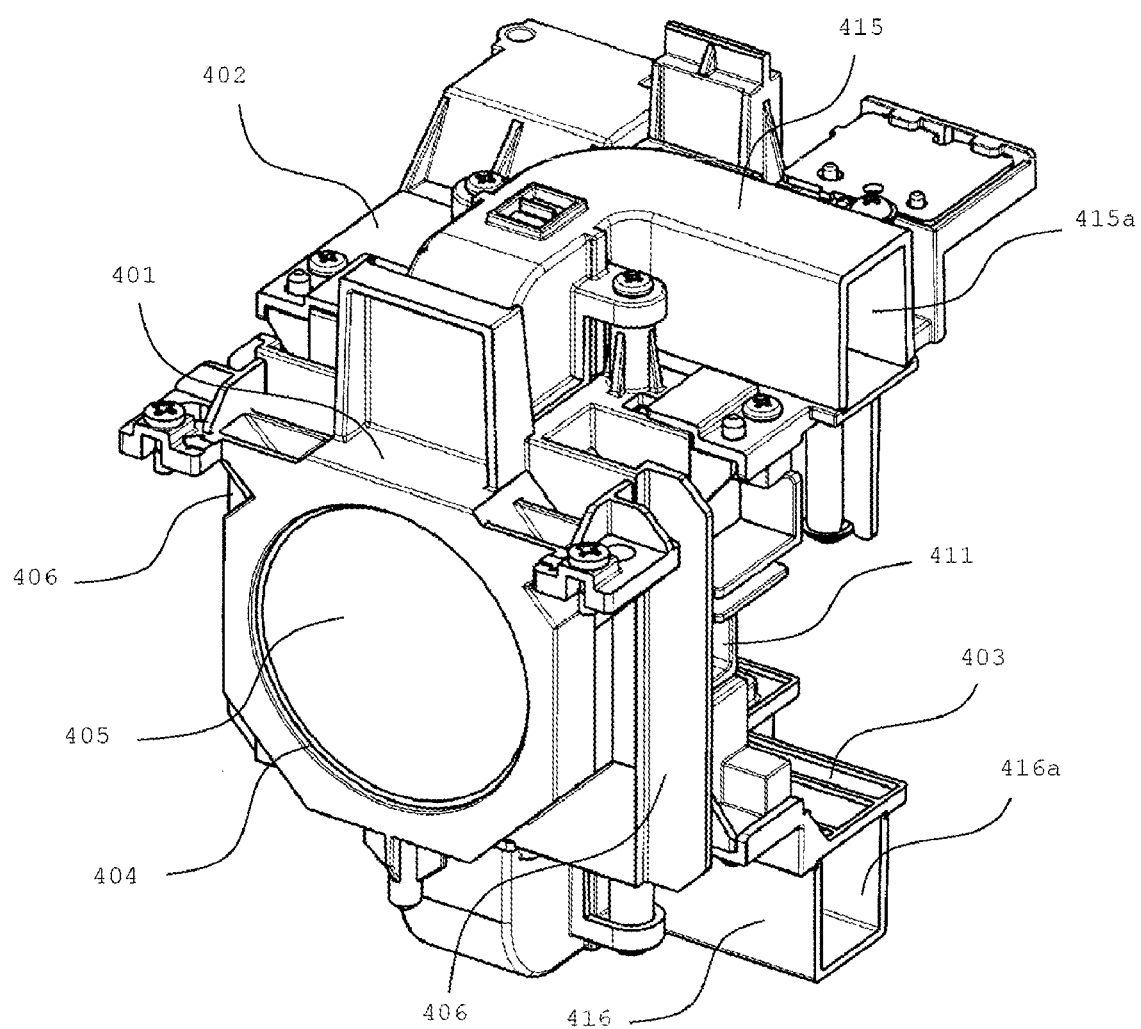
FIG. 11 is a perspective view of the lamp unit in the embodiment, when viewed from the front of the lamp unit.
Figure 12A:
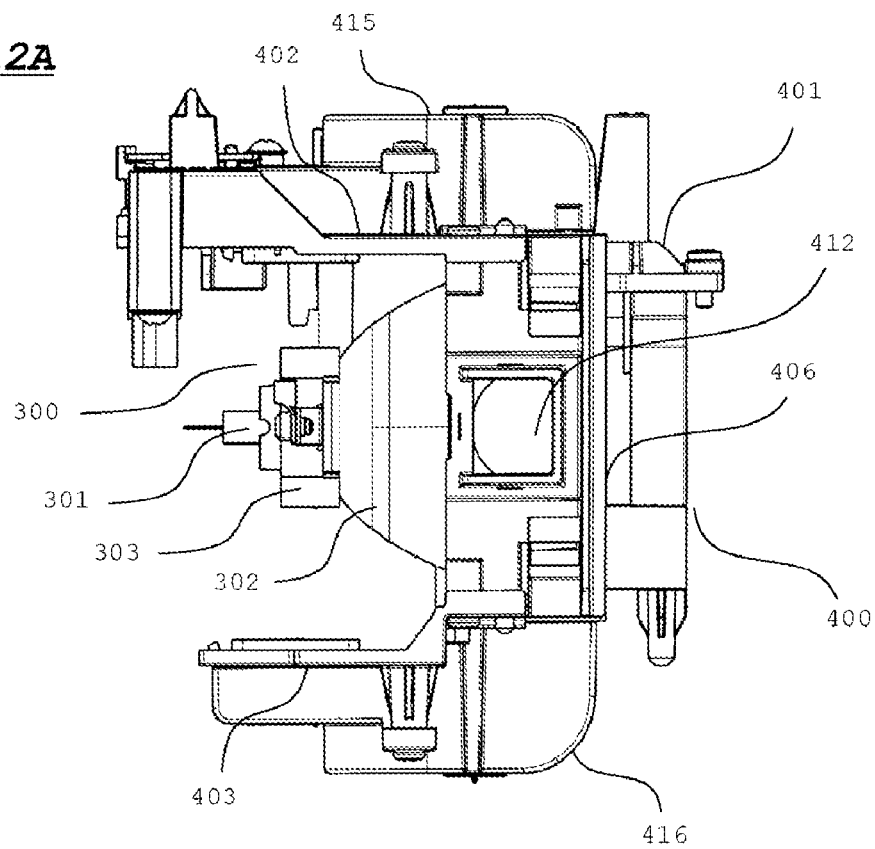
FIG. 12A is a left side view of the lamp unit in the embodiment.
Figure 12B:
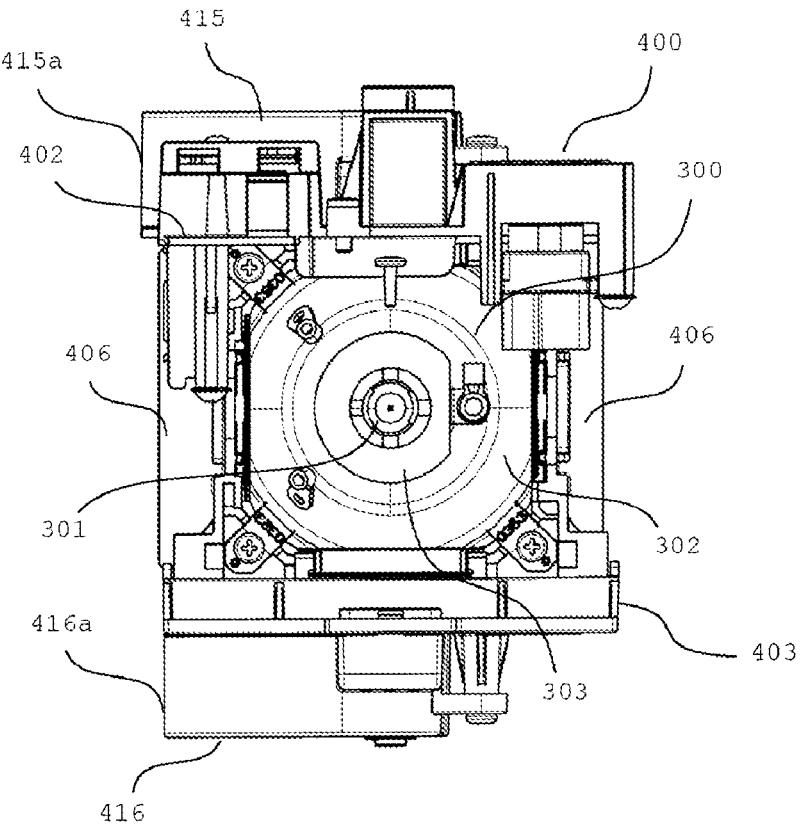
FIG. 12B is a rear view of the lamp unit in the embodiment.
Figure 13A:
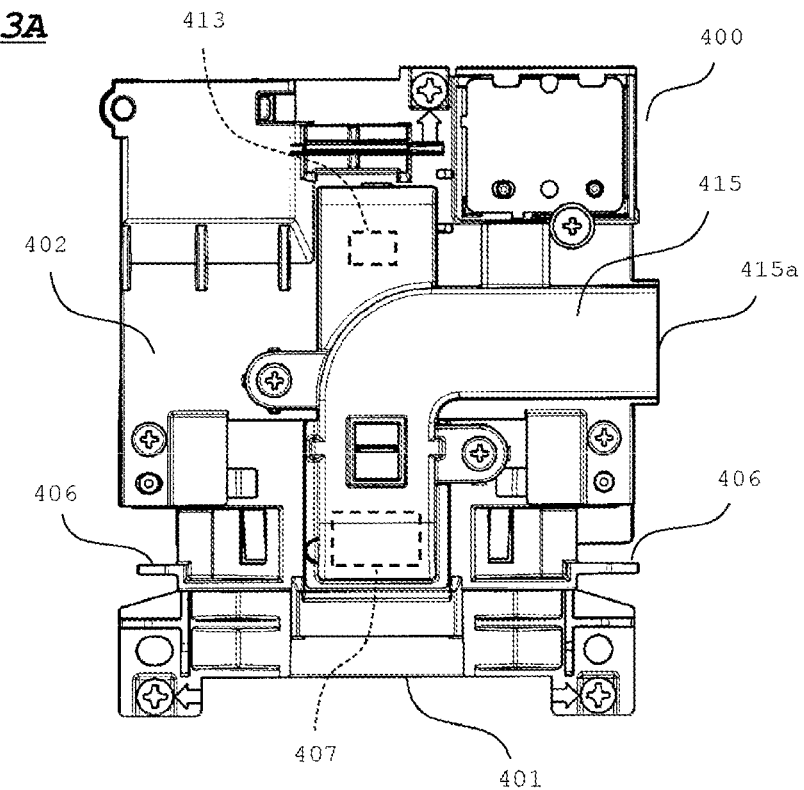
FIG. 13A is a top plan view of the lamp unit in the embodiment.
Figure 13B:
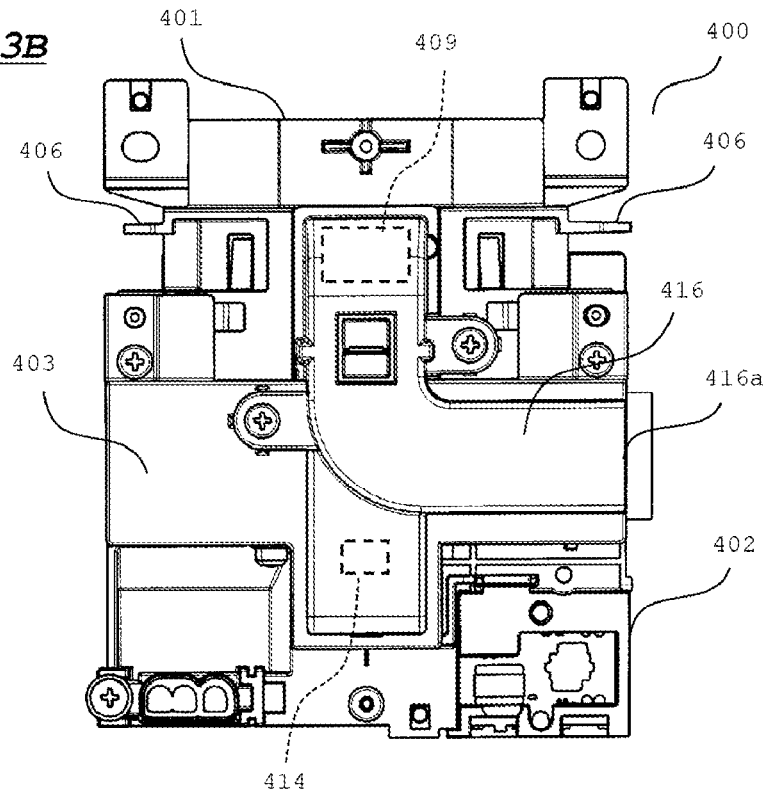
FIG. 13B is a bottom plan view of the lamp unit in the embodiment.
Figure 14:
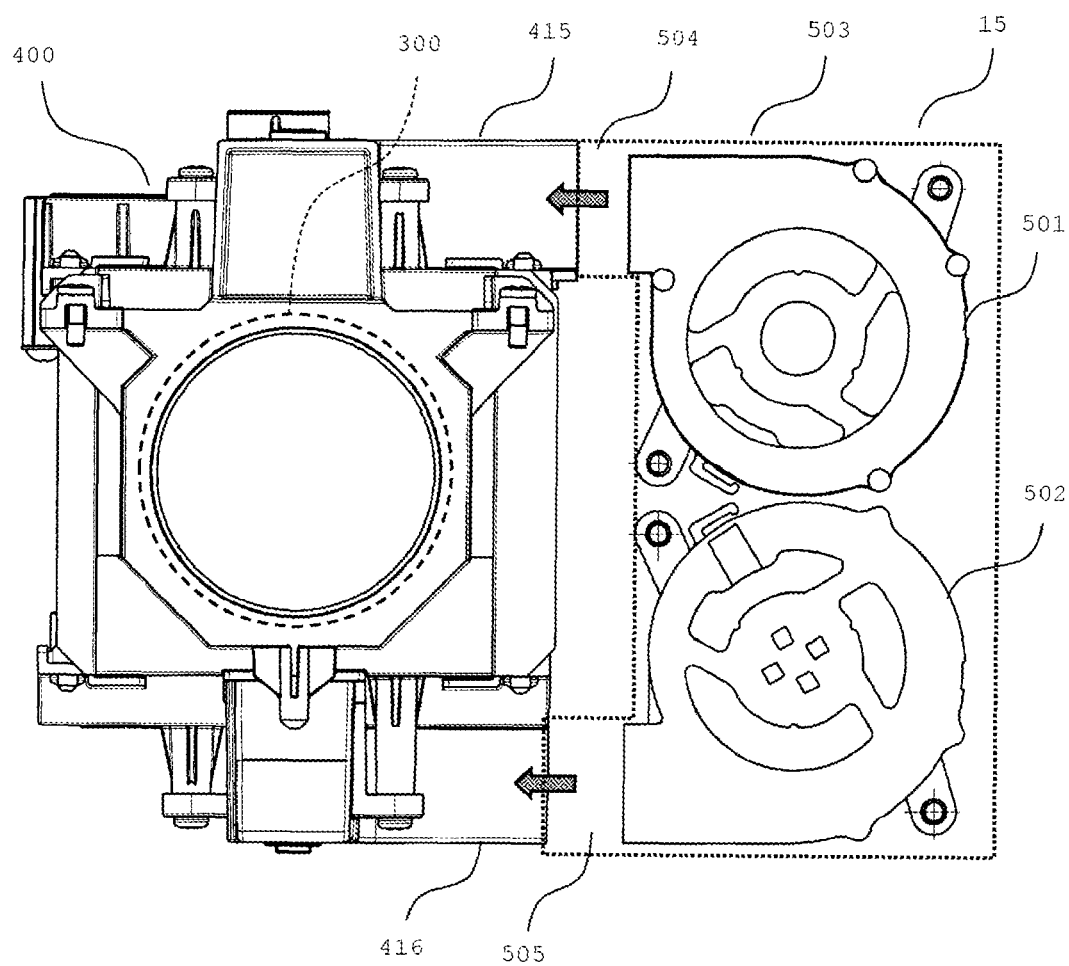
FIG. 14 is a front view showing a state that the lamp unit in the embodiment is connected to a fan unit.

FIGS. 10A and 10B, FIG. 11, FIGS. 12A and 12B, FIGS. 13A and 13B, and FIG. 14 are diagrams for describing a cooling structure of the lamp unit 13. FIG. 10A is a perspective and elevational sectional view of the lamp unit 13, when viewed from a rear of the lamp unit 13. FIG. 10B is a perspective and transverse sectional view of the lamp unit 13, when viewed from a front of the lamp unit 13. FIG. 11 is a perspective view of the lamp unit 13, when viewed from the front of the lamp unit 13. FIGS. 12A and 12B are respectively a left side view and a rear view of the lamp unit 13. FIGS. 13A and 13B are respectively a top plan view and a bottom view of the lamp unit 13. FIG. 14 is a front view showing a state that the lamp unit 13 is connected to the fan unit 15. In FIG. 14, the general contour of a housing 503 is shown by the dotted line so that cooling fans 501 and 502 disposed in the fan unit 15 can be seen.

Referring to FIGS. 10A through 14, the lamp unit 13 is constituted of the light source lamp 300, and the lamp holder 400 for holding the light source lamp 300.

The light source lamp 300 is provided with an arc tube 301 and a reflector 302. In this embodiment, a metal halide lamp is used as the arc tube 301. Alternatively, other lamp such as an ultra high-pressure mercury lamp or a xenon lamp may be used. An inner surface of the reflector 302 is formed into a paraboric shape to reflect white light emitted from the arc tube 301 on the inner surface of the reflector 302, and guide the reflected light in the forward direction.

A reflector base 303 made of e.g. plaster is formed on a rear end of the reflector 302 to fixedly mount the arc tube 301 on the reflector 302. The arc tube 301 has a seal portion 304 at an inner position of the reflector base 303.

The lamp holder 400 is provided with a holder main body 401, an upper plate 402 mounted on a rear end of an upper surface of the holder main body 401, and a bottom plate 403 mounted on a rear end of a bottom surface of the holder main body 401.

An emission window 404 through which light from the light source lamp 300 is emitted is formed in a front surface of the holder main body 401. A heat resistant concave lens 405 is fitted in the emission window 404. A rear surface of the holder main body 401 is opened, and the light source lamp 300 is mounted in the opening from a rear side.

A guide piece 406 is formed on both ends of a front portion of the holder main body 401. A guide member (not shown) having vertically extending guide grooves is formed in the lower cabinet 2 at a housing position of the lamp unit 13. The guide pieces 406 are fitted in the guide grooves from above in housing the lamp unit 13 in the lower cabinet 2.

A first air outlet 407 is formed in the upper surface of the holder main body 401. A first air deflector 408 extending obliquely downward in rearward direction is provided in the first air outlet 407. Further, a second air outlet 409 is formed in the bottom surface of the holder main body 401. A second air deflector 410 extending obliquely upward in rearward direction is provided in the second air outlet 409. Exhaust ports 411 and 412 are formed in a right side surface and a left side surface of the holder main body 401, respectively. Filters 411a and 412a in the form of a mesh are provided in the exhaust ports 411 and 412, respectively, to prevent pieces of the arc tube 301 from coming out of the projector, in case that the arc tube 301 be damaged or broken.

A third air outlet 413 is formed in the upper plate 402 at a position substantially right above the reflector base 303. Further, a fourth air outlet 414 is formed in the bottom plate 403 at a position substantially right below the reflector base 303.

An upper duct portion 415 is mounted on an upper surface of the lamp holder 400. As shown in FIG. 13A, the upper duct portion 415 has a substantially T-shape in plan view to guide the cooling air that has been drawn in through an entrance 415a formed in a right side surface of the upper duct portion 415 to the first air outlet 407 and the third air outlet 413. On the other hand, a lower duct portion 416 is mounted on a bottom surface of the lamp holder 400. As shown in FIG. 13B, the lower duct portion 416 has a substantially T-shape in plan view to guide the cooling air that has been drawn in through an entrance 416a formed in a right side surface of the lower duct portion 416 to the second air outlet 409 and the fourth air outlet 414.

Similarly to the filters 411a and 412a, filters 415b and 416b in the form of a mesh are provided in the upper duct portion 415 at a position near the first air outlet 407 and in the lower duct portion 416 at a position near the second air outlet 409, respectively, to prevent pieces of the arc tube 301 from coming out of the projector, in case that the arc tube 301 be damaged or broken.

As shown in FIG. 14, the fan unit 15 is disposed in the housing 503 in a state that two cooling fans 501 and 502 are vertically stacked one over the other. When the lamp unit 13 is mounted in the lower cabinet 2, the entrance 415a of the upper duct portion 415 is connected to an upper exit 504 of the housing 503, and the entrance 416a of the lower duct portion 416 is connected to a lower exit 505 of the housing 503.

In the above arrangement, in response to activation of the cooling fans 501 and 502, cooling airs generated by the cooling fans 501 and 502 are respectively allowed to flow through the upper duct portion 415 and the lower duct portion 416.

In FIGS. 10A and 10B, flows of the cooling air are shown by the arrows. The cooling air through the upper duct portion 415 is branched out in the duct portion into a flow in the forward direction and a flow in the rearward direction. The flow of the cooling air in the forward direction is passed through the filter 415b, drawn into the holder main body 401 through the first air outlet 407, has its direction changed by the first air deflector 408, and flows into the reflector 302. Further, the cooling air through the lower duct portion 416 is branched out in the duct portion into a flow in the forward direction and a flow in the rearward direction. The flow of the cooling air in the forward direction is passed through the filter 416b, drawn into the holder main body 401 through the second air outlet 409, has its direction changed by the second air deflector 410, and flows into the reflector 302. The interior of the reflector 302 is cooled by the flows of the cooling air which have flown into the reflector 302 from both sides i.e. from the upper and lower duct portions. Thereafter, the cooling air in the reflector 302 is passed through the filters 411a and 412a, and discharged to the exterior of the lamp unit 13 through the exhaust ports 411 and 412.

On the other hand, the flow of the cooling air in the rearward direction in the upper duct portion 415 is drawn in through the third air outlet 413, and impinges on the reflector base 303 of the light source lamp 300 from above. Further, the flow of the cooling air in the rearward direction in the lower duct portion 416 is drawn in through the fourth air outlet 414, and impinges on the reflector base 303 of the light source lamp 300 from below. As a result of the above operation, the reflector base 303 is cooled from both sides i.e. from the upper and lower duct portions, and the seal portion 304 is cooled via the reflector base 303.

As described above, the cooling air which has exited the lamp unit 13 is discharged to the exterior of the cabinet 1 by the exhaust fan 25.

The upper portion of the light source lamp 300 is heated to a high temperature, as compared with the lower portion of the light source lamp 300 at the time of light emission, due to an influence of a gravitational force. In the case where the projector is mounted in a fixed position, the lamp unit 13 is brought to a state as shown in FIG. 10A, and a portion of the light source lamp 300 corresponding to the upper duct portion 415 is heated to a high temperature, as compared with a portion of the light source lamp 300 corresponding to the lower duct portion 416. On the other hand, in the case where the projector is suspended from a ceiling, the lamp unit 13 is brought to a state opposite to the state shown in FIG. 10A, and the portion of the light source lamp 300 corresponding to the lower duct portion 416 is heated to a high temperature, as compared with the portion of the light source lamp 300 corresponding to the upper duct portion 415.

In this embodiment, since the flows of the cooling air branched out by the upper duct portion 415 and the lower duct portion 416 are guided into the reflector 302 from both sides i.e. from the upper and lower duct portions, it is possible to efficiently cool a high-temperature portion of the light source lamp 300, without depending on whether the projector is mounted in a fixed position or mounted from a ceiling.

In the case where the projector is mounted in a fixed position, it is desirable to set the air volume of the cooling fan 501 for supplying the air to the upper duct portion 415 higher than the air volume of the cooling fan 502 for supplying the air to the lower duct portion 416 to efficiently cool the portion of the light source lamp 300 corresponding to the upper duct portion 415. On the other hand, in the case where the projector is mounted from a ceiling, it is desirable to set the air volume of the cooling fan 502 higher than the air volume of the cooling fan 501 to efficiently cool the portion of the light source lamp 300 corresponding to the lower duct portion 416.

Further, in the light source lamp 300, the seal portion 304 is heated to a high temperature by heat generation in the arc tube 301 resulting from light emission of the arc tube 301. If the seal portion 304 is exceedingly heated, the seal portion 304 may be deteriorated, with the result that the performance of the light source lamp 300 may be deteriorated. Since the seal portion 304 is disposed at a position relatively away from the inner surface of the reflector 302, the seal portion 304 may not be sufficiently cooled by the cooling air that has been draw into the interior of the reflector 302. It may be possible to enhance the cooling performance by increasing the air volume of the cooling air. However, an enhanced cooling performance may excessively cool the arc tube 301, which may obstruct a normal light emission.

In this embodiment, since the flows of the cooling air which have branched out by the upper duct portion 415 and the lower duct portion 416 are directly supplied to the reflector base 303 from both sides i.e. from the upper and lower duct portions, the entirety of the reflector base 303 is efficiently cooled, and the seal portion 304 is efficiently cooled via the reflector base 303. Thus, it is possible to prevent lowering of the performance of the light source lamp 300 due to deterioration of the seal portion 304.

Attachment Structure of Prism Cover and Lamp Cover

FIG. 15 is a perspective view of the upper cabinet 3 in a state that the prism cover 10 and the lamp cover 11 are detached.

A recess 601 in which the prism cover 10 and the lamp cover 11 are mounted is formed in an area of the upper cabinet 3 from a central part to a right side surface of the upper cabinet 3. The recess 601 has a first area 601a where the prism cover 10 is mounted, and a second area 601b where the lamp cover 11 is mounted.

A prism opening 602 is formed in the first area 601a. The prism opening 602 is formed at a position substantially right above the prism unit 16 disposed in the lower cabinet 2, and has a size capable of mounting and dismounting the prism unit 16.

Guide ribs 603 are formed at two positions on each of a front wall surface and a rear wall surface of the first area 601a. Predetermined clearances are formed between the guide ribs 603 and a bottom surface of the recess 601. Further, an insertion hole 604 is formed at two positions on a left wall surface of the first area 601a. Furthermore, a nut 605 is embedded in upward direction in a central part on a right end of the first area 601a, and a screw hole of the nut 605 faces upward.

A lamp opening 606 is formed in the second area 601b. The lamp opening 606 is formed at a position substantially right above the lamp unit 13 disposed in the lower cabinet 2, and has a size capable of mounting and dismounting the lamp unit 13. A pair of guide portions 607 is formed on a front edge and a rear edge of the lamp opening 606. Each of the paired guide portions 607 is constituted of two ribs arranged side by side in transverse direction with a predetermined clearance. When the lamp unit 13 is housed in the lower cabinet 2, the guide pieces 406 of the lamp holder 400 are guided between the respective rib pairs.

In the second area 601b, the lamp opening 606, and left and right portions of the lamp opening 606 are recessed from the first area 601a. An insertion hole 608 is formed at two positions in a wall surface corresponding to the step difference between the first area 601a and the second area 601b.

A transversely extending guide groove 609 is formed in each of the front edge and the rear edge of the second area 601b. A transversely extending guide hole 609a is formed in a side surface of each of the guide grooves 609. Further, an opening 609b for passing a stem portion 808 of the lamp cover 11 is formed at an outer position substantially in the middle of each of the guide grooves 609.

A nut 610 is embedded in transverse direction in a right end of the second area 601b, and a screw hole of the nut 610 faces transversely through an attachment hole 611 formed in a side surface of the recess 601. Further, an attachment hole 612 for screw fastening is formed in a right end of the second area 601b in fixedly mounting the upper cabinet 3 on the lower cabinet 2. Furthermore, a transversely extending groove portion 613 is formed in the right end of the second area 601b. An opening 613a is formed in a left end of the groove portion 613, and a micro switch (not shown) for detecting whether the lamp cover 11 is completely closed faces the groove portion 613 through the opening 613a.

Figure 16A:
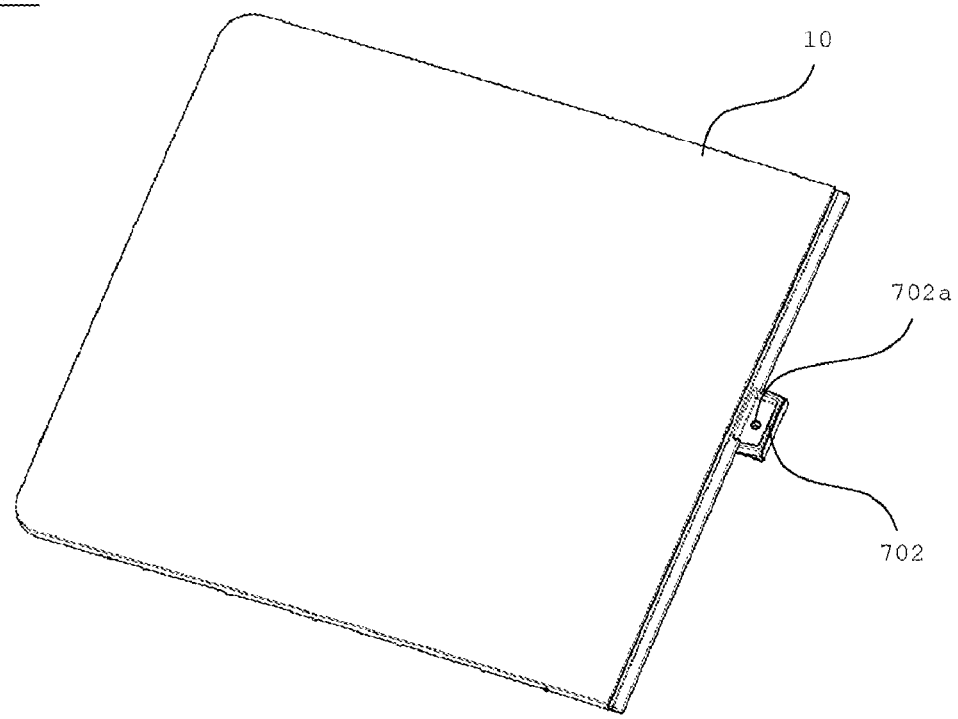
FIGS. 16A and 16B are diagrams showing an arrangement of the prism cover in the embodiment.
Figure 16B:
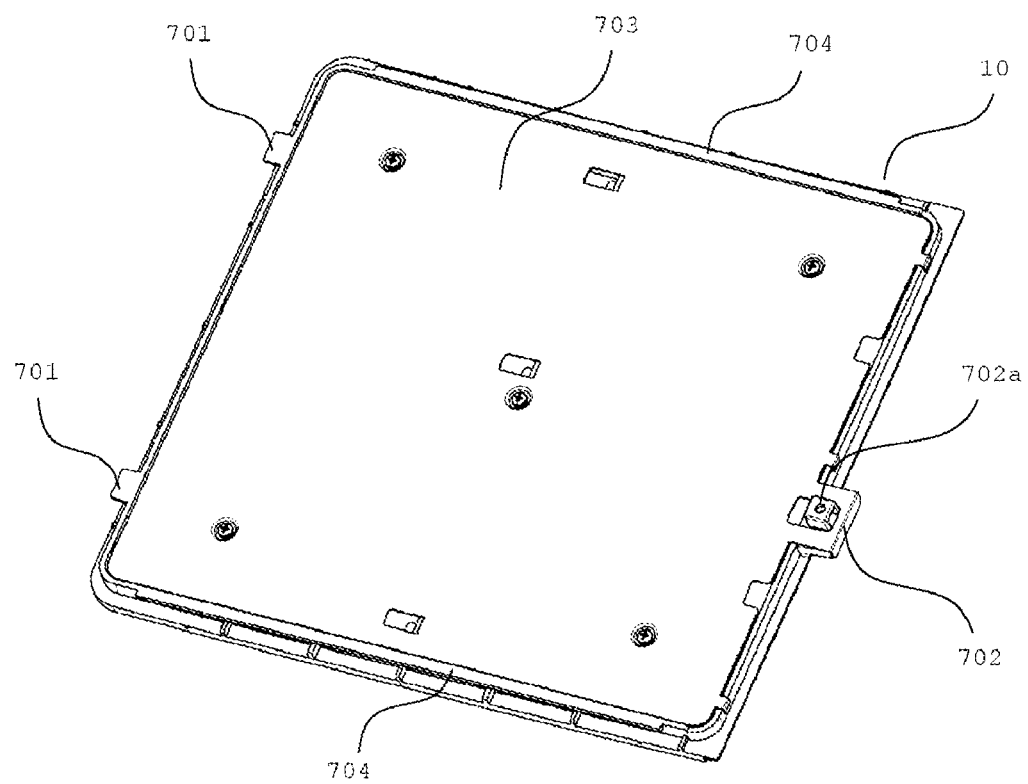

FIGS. 16A and 16B are diagrams showing an arrangement of the prism cover 10. FIG. 16A is a perspective view of the prism cover 10, when viewed from a front side of the prism cover 10, and FIG. 16B is a perspective view of the prism cover 10, when viewed from a back side of the prism cover 10.

The prism cover 10 is formed into a rectangular shape, and has a thickness substantially equal to the depth of the recess 601. A projection 701 is formed at two positions on a left end of the prism cover 10. Further, an attachment piece 702 having an attachment hole 702a is provided substantially in the middle on a right end of the prism cover 10.

A metal shield plate 703 is mounted on a back surface of the prism cover 10 to suppress unwanted radiation from e.g.

the prism opening 602. Further, a transversely extending guided rib 704 is formed on each of a front end and a rear end of the prism cover 10.

Figure 17A:
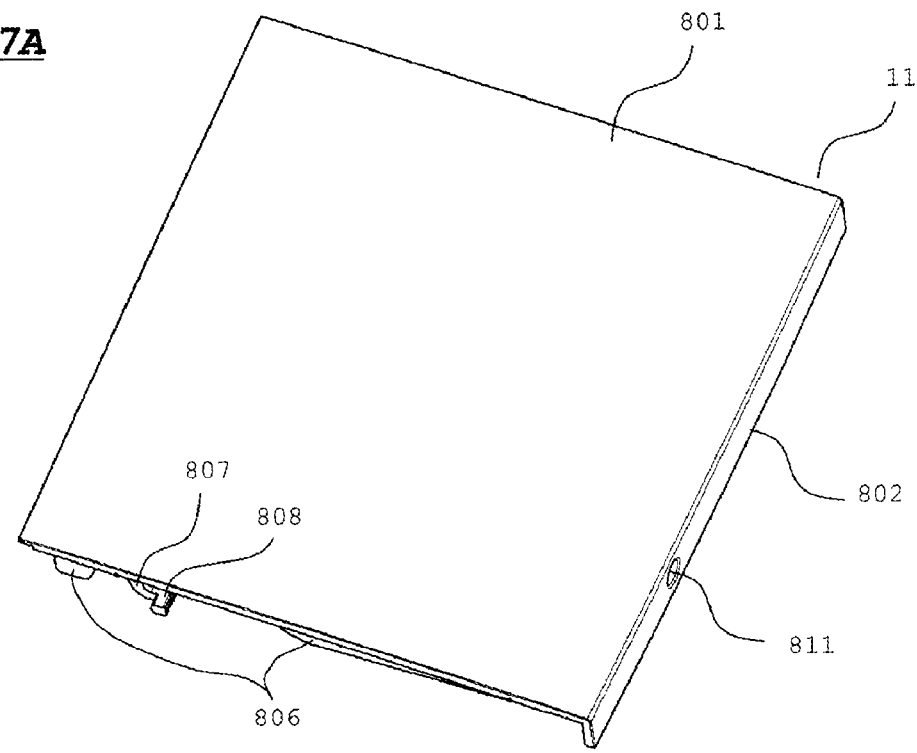
FIGS. 17A and 17B are diagrams showing an arrangement of the lamp cover in the embodiment.
Figure 17B:
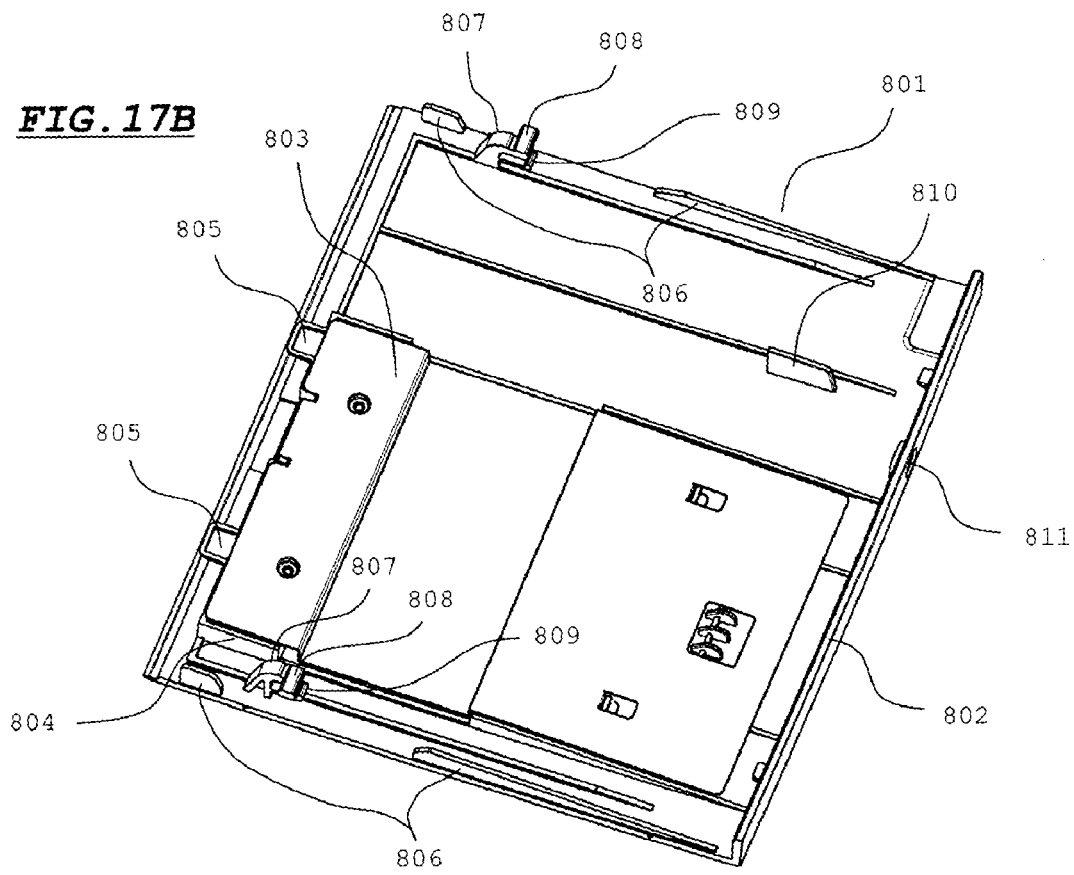

FIGS. 17A and 17B are diagrams showing an arrangement of the lamp cover 11. FIG. 17A is a perspective view of the lamp cover 11, when viewed from a front side of the lamp cover 11, and FIG. 17B is a perspective view of the lamp cover 11, when viewed from a back side of the lamp cover 11.

The lamp cover 11 is constituted of an upper plate 801 and a side plate 802. As shown in FIGS. 1A and 1B, the upper surface of the upper cabinet 3 has a moderately curved shape such that the upper surface is lowered from a central part thereof in leftward and rightward directions. The upper plate 801 is moderately inclined toward the side plate 802 in conformity with the upper surface shape of the upper cabinet 3.

A metal shield plate 803 is provided on a back surface of the upper plate 801. The shield plate 803 is mounted on a holding portion 804 which is slightly bulged from the back surface of the upper plate 801. The shield plate 803 shields the lamp opening 606 in mounting the lamp cover 11 on the upper cabinet 3. The shield plate 803 suppresses unwanted radiation from the lamp opening 606, and protects the lamp cover 11 from a heat generated in the lamp unit 13 (light source lamp 300). A projection 805 is formed at two positions on a left end of the holding portion 804.

Support ribs 806 are respectively formed on a front end and a rear end on the back surface of the upper plate 801. Because of the arrangement that each of the support ribs 806 has such a shape that a certain part thereof is cut away between a left end and a right end thereof, and the upper plate 801 is inclined, the height of each of the support ribs 806 is reduced toward the side plate 802. The support ribs 806 support the upper plate 801 with respect to the bottom surface of the recess 601 in mounting the lamp cover 11 on the upper cabinet 3 (see FIG. 18B).

Further, an arm portion 807 is formed on each of the front end and the rear end of the back surface of the upper plate 801. Each of the arm portions 807 has a lead end thereof bent toward the side plate 802, and the outwardly extending stem portion 808 is formed at the lead end of each of the arm portions 807. Further, a stopper portion 809 extending in parallel to the lead end is formed on each of the arm portions 807 (see FIG. 20).

Further, a rib 810 to be housed in the groove portion 613 of the upper cabinet 3 is formed on the back surface of the upper plate 801. When the lamp cover 11 is completely closed, the micro switch is pressed by the rib 810. Then, the micro switch is turned on, and it is detected that the lamp cover 11 is completely closed.

An attachment hole 811 is formed in the side plate 802.

Figure 18A:
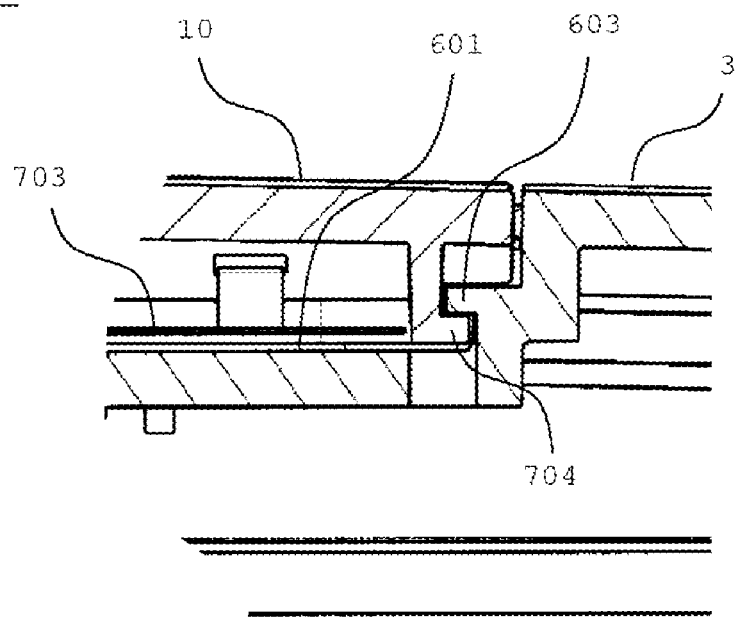
FIGS. 18A and 18B are cross-sectional views showing essential parts of the upper cabinet in a state that the prism cover and the lamp cover are mounted on the upper cabinet in the embodiment.

Thus, when the prism cover 10 is mounted on the upper cabinet 3, the prism cover 10 is housed in the recess 601 from the right end of the first area 601a, and slidingly moved in leftward direction. Then, as shown in FIG. 18A, the guided ribs 704 are housed in the clearances between the guide ribs 603 and the bottom surface of the recess 601. This suppresses an upward movement of the prism cover 10.

When the prism cover 10 is completely closed, the projections 701 are received in the insertion holes 604 of the recess 601. This suppresses an upward movement of the left end of the prism cover 10. Further, the attachment hole 702a of the prism cover 10 is aligned with the screw hole of the nut 605. Then, by screw-fastening the nut 605, the prism cover 10 is fixedly mounted on the upper cabinet 3.

Figure 18B:
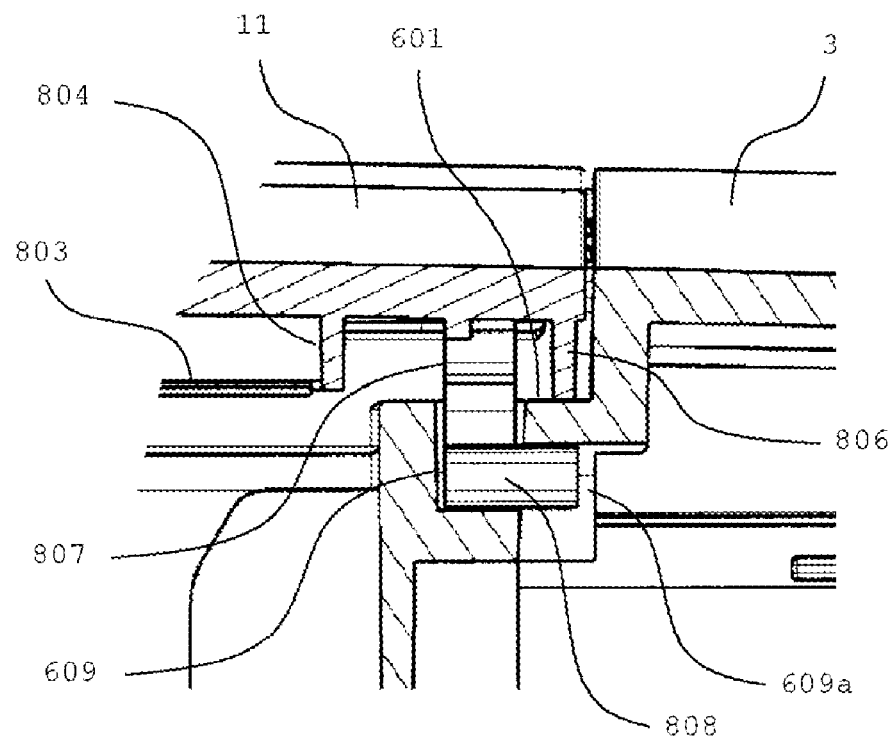

Next, as shown in FIG. 18B, when the lamp cover 11 is mounted on the upper cabinet 2, the arm portions 807 are housed in the guide grooves 609 from above, and the stem portions 808 are received in the guide holes 609a. In the insertion operation, the stem portions 808 are received in the guide holes 609a through the openings 609b. Thereafter, the lamp cover 11 is slidingly moved in leftward direction. Then, the stem portions 808 are moved in leftward direction along the guide holes 609a. As a result of the above operation, an upward movement of the lamp cover 11 is suppressed by the stem portions 808 received in the guide holes 609a and the support ribs 806.

When the lamp cover 11 is completely closed, the left end of the lamp cover 11 is placed over the right end of the prism cover 10. As a result of the above operation, the screws of the prism cover 10 are covered by the lamp cover 11. Further, the projections 805 of the lamp cover 11 are received in the insertion holes 608 of the recess 601. As a result of the above operation, an upward movement of the left end of the lamp cover 11 is suppressed. Further, the attachment hole 811 of the lamp cover 11 is aligned with the screw hole of the nut 610. Then, by screw-fastening the nut 610, the lamp cover 11 is fixedly mounted on the upper cabinet 3.

As described above, as shown in FIGS. 1A and 1B, by performing the above operations, both of the prism cover 10 and the lamp cover 11 are mounted on the upper cabinet 3.

The lamp unit 13 (light source lamp 300) and the prism unit 16 are deteriorated by a long-time operation. In such a case, it is necessary to replace the lamp unit 13 and the prism unit 16 with new ones. The lamp unit 13 is easily deteriorated, as compared with the prism unit 16, and the replacement frequency of the lamp unit 13 is larger than the replacement frequency of the prism unit 16.

In the case where the lamp unit 13 is replaced, the lamp cover 11 is opened to mount or dismount the lamp unit 13 through the lamp opening 606. Replacement of the lamp unit 13 may be performed by the user.

Figure 19A:
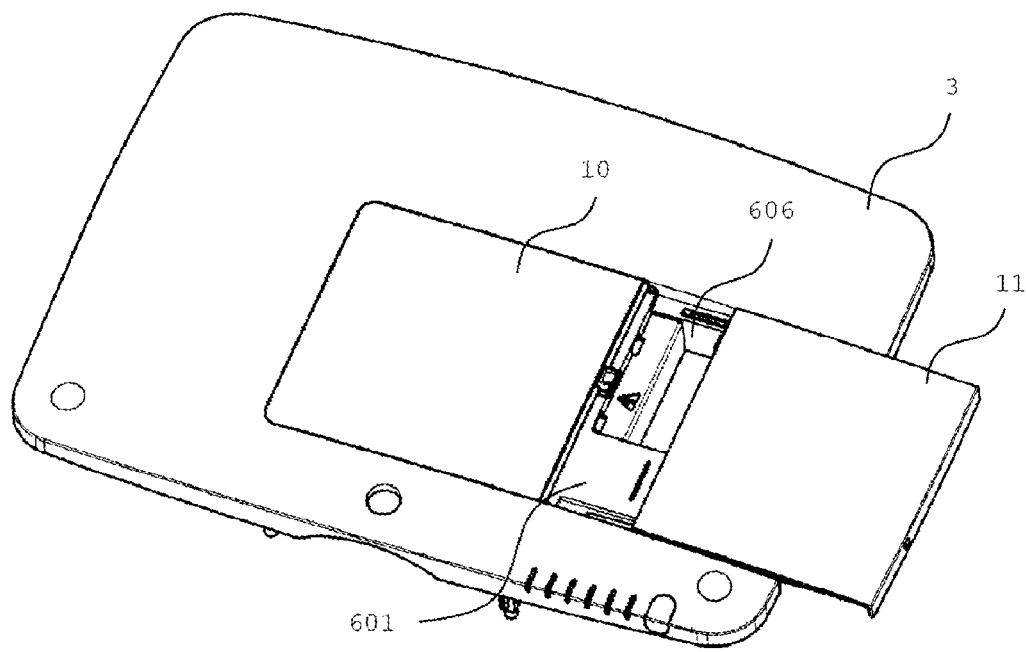
FIGS. 19A and 19B are diagrams showing a state that the lamp cover in the embodiment is opened.
Figure 19B:
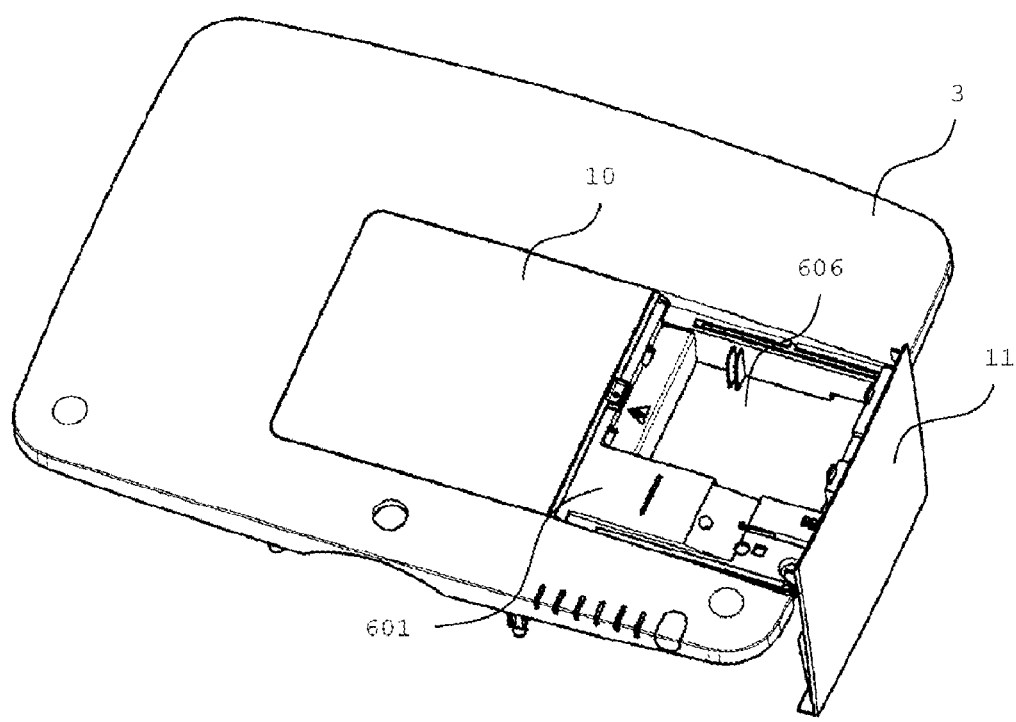
Figure 20:
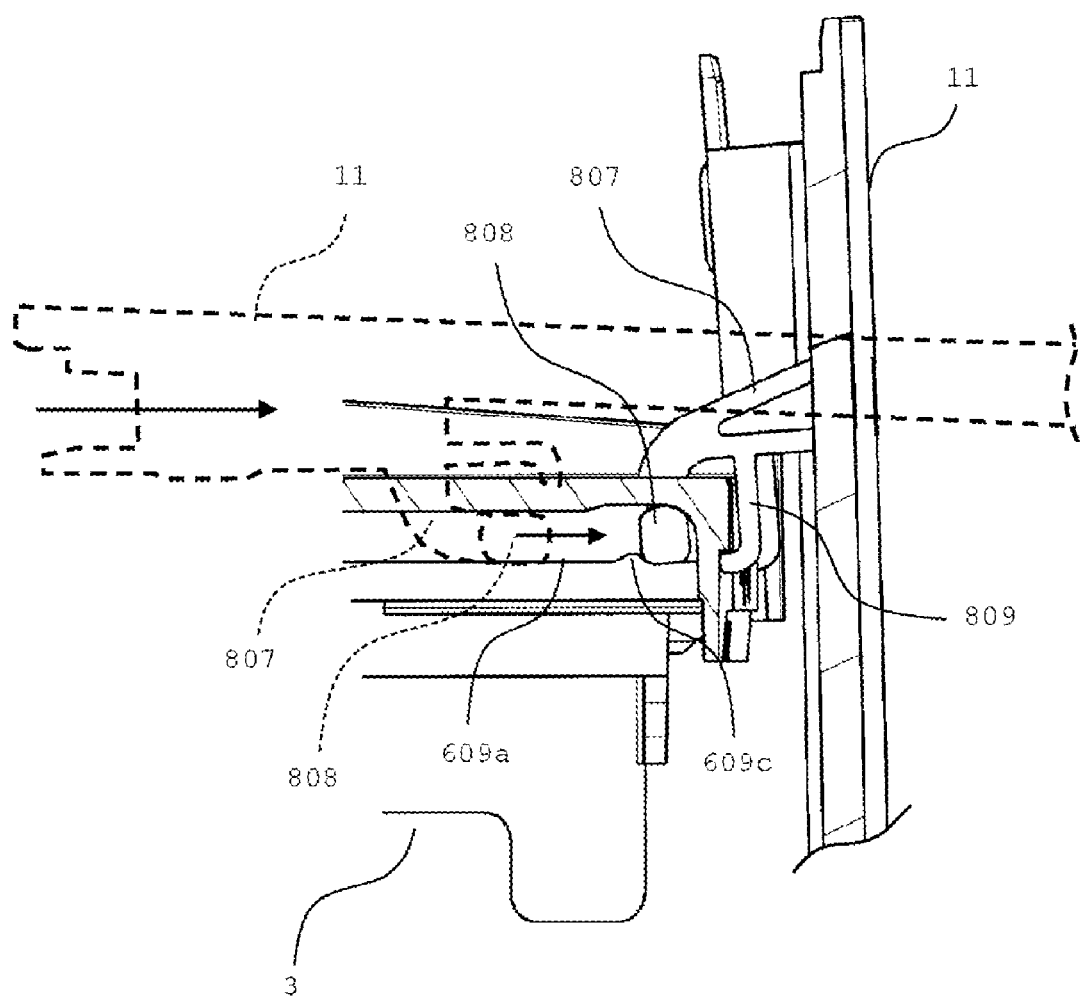
FIG. 20 is a cross-sectional view showing essential parts of the upper cabinet for describing an operation to be performed for the lamp cover, in the case where the lamp cover in the embodiment is opened.

FIGS. 19A and 19B are diagrams showing a state that the lamp cover 11 is opened. FIG. 19A shows a state that the lamp cover 11 is halfway opened, and FIG. 19B shows a state that the lamp cover 11 is completely opened. FIG. 20 is a cross-sectional view showing essential parts of the upper cabinet 3 for describing an operation to be performed for the lamp cover 11 in the case where the lamp cover 11 is opened.

In the case where the lamp unit 13 is replaced, the user unfastens the screw, and slidingly moves the lamp cover 11 in rightward direction. By performing the above operation, as shown in FIG. 19A, the lamp opening 606 is gradually opened. Then, as shown by the broken line in FIG. 20, the user is allowed to move the stem portions 808 in rightward direction within the guide holes 609a.

When the stem portions 808 reach the right end of the guide holes 609a, the lamp cover 11 is not slidingly moved any more. In this state, a right end portion of the lamp opening 606 is still covered by the lamp cover 11.

Next, the user pushes a portion of the lamp cover 11 projecting from the right end of the upper cabinet 3 in downward direction. Then, as shown by the solid line in FIG. 20, the lamp cover 11 is pivotally moved about the stem portions 808. In this state, as shown in FIG. 17B, since the support ribs 806 are cut away at a position around the arm portions 807, there is no likelihood that the support ribs 806 may be abutted against a corner of the upper cabinet 3 in pivotally moving the lamp cover 11.

As described above, as shown in FIG. 19B, the lamp cover 11 stands upright along the right side surface of the upper cabinet 3, and the lamp opening 606 is completely opened. In this state, as shown in FIG. 20, the stopper portions 809 are abutted against the right side surface of the upper cabinet 3.

As shown in FIG. 20, a bulging projection 609c is formed below and at a right end of each of the guide holes 609a. The height of the projection 609c is very small. Accordingly, by applying a small external force in slidingly moving the lamp cover 11, the stem portions 808 are moved over the projections 609c, and reach the right ends of the guide holes 609a, respectively. In this state, left portions of the stem portions 808 are supported by the projections 609a. Since the stem portions 808 are easily rotatable, the lamp cover 11 is smoothly and pivotally moved.

When the lamp opening 606 is completely opened, the user is allowed to dismount the deteriorated lamp unit 13 through the lamp opening 606. Then, the user is allowed to house a new lamp unit 13 in the lower cabinet 2 through the lamp opening 606. Then, the user is allowed to close the lamp cover 11, and fasten the screw to fixedly mount the lamp cover 11 on the upper cabinet 3 by a sequence opposite to the sequence to be performed in opening the lamp opening 606.

In the case where the prism unit 16 is replaced, the prism opening 10 is opened, and the prism unit 16 is mounted or dismounted through the prism opening 602. Replacement of the prism unit 16 is performed by a serviceperson.

Figure 21A:
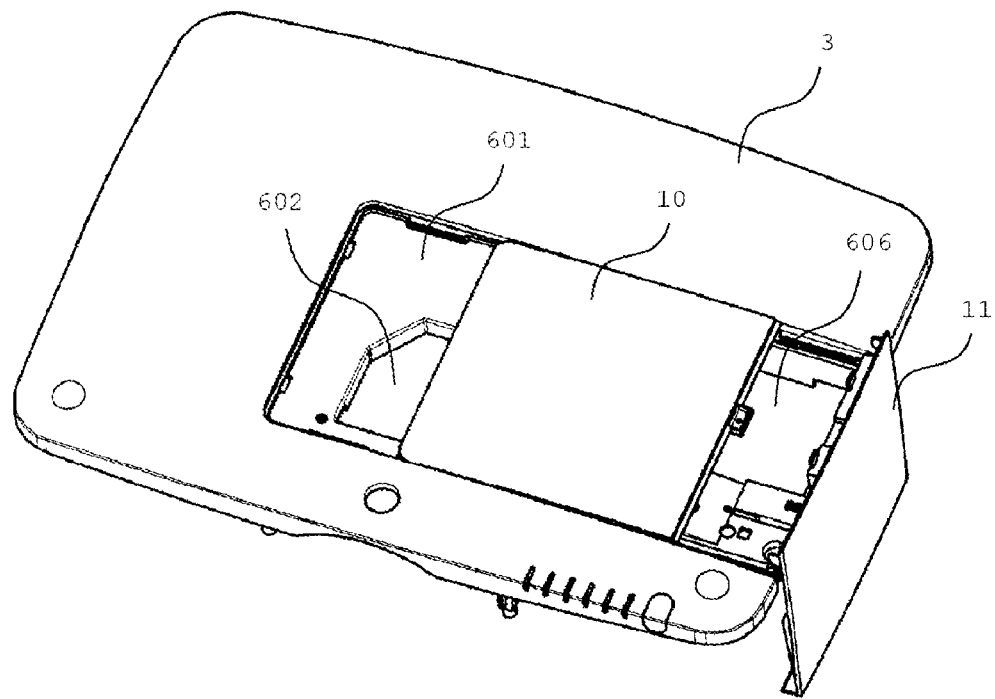
FIGS. 21A and 21B are diagrams showing a state that the prism cover in the embodiment is opened.
Figure 21B:
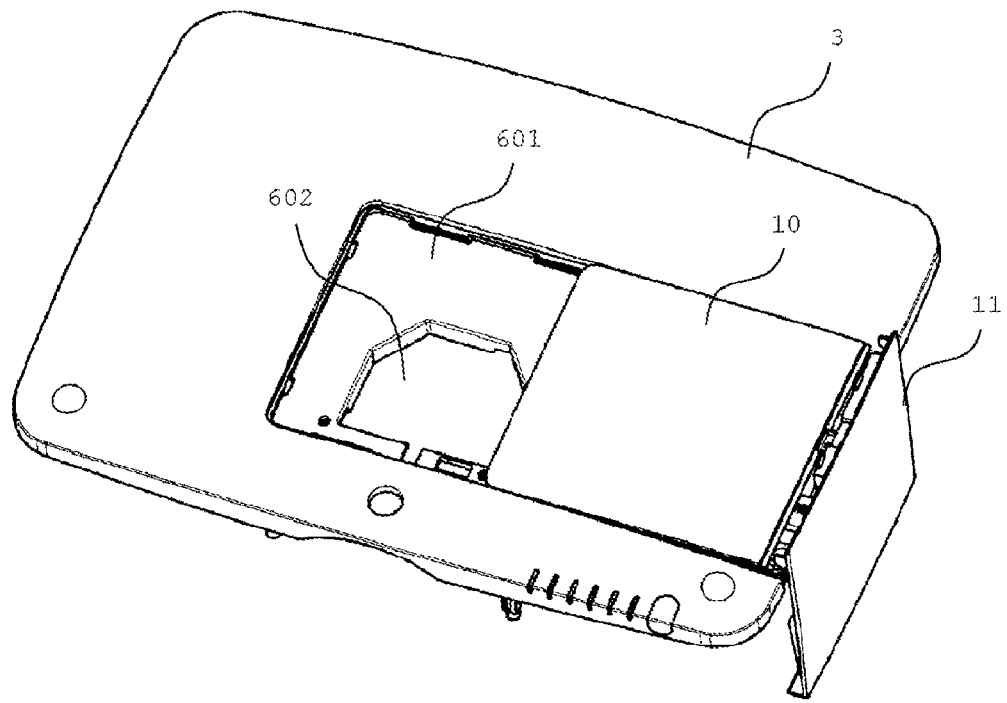

FIGS. 21A and 21B are diagrams showing a state that the prism cover 10 is opened. FIG. 21A shows a state that the prism cover 10 is halfway opened, and FIG. 21B shows a state that the prism cover 10 is completely opened.

In the case where the prism unit 16 is replaced, a serviceperson opens the lamp cover 11 by the above sequence. Then, the serviceperson unfastens the screw, and slidingly moves the prism cover 10 in rightward direction. Then, as shown in FIG. 21A, the prism cover 10 is slidingly retracted in the space of the recess 601 which is defined by opening the lamp cover 11. Then, as shown in FIG. 21B, by slidingly moving the prism cover 10 to the right end of the recess 601, the prism opening 602 is completely opened.

When the prism opening 602 is completely opened, the serviceperson is allowed to dismount the deteriorated prism unit 16 through the prism opening 602. Then, the serviceperson is allowed to house a new prism unit 16 in the lower cabinet 2 through the prism opening 602. Then, the serviceperson is allowed to close the prism cover 10, and fasten the screw to fixedly mount the prism cover 10 on the upper cabinet 3 by the sequence opposite to the sequence to be performed in opening the prism opening 602. Lastly, the lamp cover 11 is closed.

As described above, in this embodiment, by slidingly moving the prism cover 10, the prism opening 602 is opened. Further, by slidingly moving the lamp cover 11, the lamp opening 606 is opened. In this way, even if the space defined above the cabinet 1 is small in installing the projector, the prism opening 602 and the lamp opening 606 can be sufficiently opened.

Further, in this embodiment, since both ends of each of the prism cover 10 and the lamp cover 11 are securely fixed so that the both ends are not moved in upward direction in slidingly moving the prism cover 10 and the lamp cover 11, there is no or less step difference between the prism cover 10 and the lamp cover 11, and the upper cabinet 3. Thus, a sophisticated appearance of the projector is secured.

Further, the embodiment is configured to slidingly move the prism cover 10 with respect to the second area 601b in opening the prism cover 10. Accordingly, there is no need of additionally forming a recess in the upper cabinet 3 to house the slidable prism cover 10. This is advantageous in simplifying the arrangement of the upper cabinet 3.

In the above case, it is necessary to open the lamp cover 11 to open the prism cover 10. However, since the replacement frequency of the prism unit 16 is smaller than the replacement frequency of the lamp unit 13, a burden of operation is reduced.

Further, in this embodiment, when the lamp cover 11 is slidingly moved to some extent, the lamp cover 11 is bent downward, thereby completely opening the lamp opening 606. This enables to reduce the sliding amount of the lamp cover 11, and suppress a projecting amount of the lamp cover 11 from the cabinet 1 in slidingly moving the lamp cover 11. Thus, it is possible to reduce the space for sliding movement, which is necessary in opening or closing the lamp cover 11. Further, even if an external force is applied from above by e.g. hitting of a user's/serviceperson's hand in a state that the lamp cover 11 is opened to the right end, the force is absorbed by pivotal movement of the lamp cover 11. Thus, it is possible to prevent damage or breakage of the lamp cover 11.

In this embodiment, the prism unit 16 is disposed in the central part of the cabinet 1, and the lamp unit 13 is disposed near the right side surface of the cabinet 1. Alternatively, the prism unit 16 may be disposed at a position near the side surface of the cabinet 1, depending on the structure of the projector. In the modification, the arrangements of the prism cover 10 and the lamp cover 11 are opposite to those in the embodiment. In the modification, since it is necessary to open the prism cover in order to open the lamp cover, a burden of operation may be slightly increased.

Further, it is not necessary to dispose the prism opening 602 and the lamp opening 606 independently of each other. Alternatively, the prism opening 602 and the lamp opening 606 may be communicated with each other. Specifically, a single opening for covering the disposition areas of the lamp unit 13 and the prism unit 16 may be formed in the cabinet 1 so that the lamp unit 13 and the prism unit 16 can be dismounted through the single opening. In the modification, the prism cover 10 and the lamp cover 11 may be formed into one cover.

The embodiment of the invention has been described as above, but the invention is not limited to the foregoing embodiment. Further, the embodiment of the invention may be changed or modified in various ways as necessary, as far as such changes and modifications do not depart from the scope of the claims of the invention hereinafter defined.

What is claimed is:

1. A projection display device comprising:
a light source;
an optical system which modulates light from the light source, and emits the modulated light;
a projecting portion which enlarges and projects the light emitted from the optical system;
a cabinet which houses the light source, the optical system, and the projecting portion;
an opening which is formed in one surface of the cabinet to allow mounting or dismounting of an optical component constituting the optical system, or the light source;
a cover which covers the opening; and
a holding portion which holds the cover in such a manner that the cover is allowed to slide in a direction along the one surface of the cabinet,
wherein the opening includes a first opening through which one of the optical component and the light source is mounted or dismounted, and a second opening through which the other of the optical component and the light source is mounted or dismounted,
the cover includes a first cover which covers the first opening, and a second cover, separate from the first cover, which covers the second opening, and the holding portion includes a first holding portion which holds the first cover, and a second holding portion which holds the second cover, and further wherein the first cover and the second cover are arranged side by side on the one surface, the first holding portion holds the first cover in such a manner that the first cover is slidably moved from a closing position at which the first cover closes the first opening in a direction different from a direction in which the second cover is disposed, and the second holding portion holds the second cover in such a manner that the second cover is slidably moved from a closing position at which the second cover covers the second opening to the closing position of the first cover.

2. The projection display device according to claim 1, wherein the holding portion holds the cover in such a manner that the cover is pivotally moved in a direction away from the one surface when the cover is opened to a predetermined position.

3. The projection display device according to claim 1, wherein the first opening is an opening through which the light source is mounted or dismounted, and the second opening is an opening through which the optical component is mounted or dismounted.

4. The projection display device according to claim 2, wherein the first opening is an opening through which the light source is mounted or dismounted, and the second opening is an opening through which the optical component is mounted or dismounted.

* * * * *